(12) United States Patent
Katai et al.

(10) Patent No.: US 10,866,722 B2
(45) Date of Patent: Dec. 15, 2020

(54) METHODS AND SYSTEMS FOR MANAGING MULTIPLE COMMUNICATION LINES WITHIN A SINGLE ON-SCREEN USER INTERFACE

(71) Applicant: Verizon Patent and Licensing Inc., Arlington, VA (US)

(72) Inventors: Lonnie Katai, Murphy, TX (US); Kristopher T. Frazier, McKinney, TX (US); Michael J. D'Argenio, Green Brook, NJ (US); Zachariah Eamon Nelson, Elizabeth, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 866 days.

(21) Appl. No.: 14/980,561

(22) Filed: Dec. 28, 2015

(65) Prior Publication Data
US 2017/0185252 A1     Jun. 29, 2017

(51) Int. Cl.
| | | |
|---|---|---|
| *G06F 3/0488* | (2013.01) | |
| *G06F 3/0482* | (2013.01) | |
| *H04B 1/3827* | (2015.01) | |
| *H04L 29/08* | (2006.01) | |
| *G06F 3/0481* | (2013.01) | |

(52) U.S. Cl.
CPC .......... *G06F 3/0488* (2013.01); *G06F 3/0481* (2013.01); *G06F 3/0482* (2013.01); *H04B 1/3833* (2013.01); *H04L 67/14* (2013.01); *H04L 67/36* (2013.01)

(58) Field of Classification Search
CPC .. G06F 3/0488; G06F 3/04817; G06F 3/0482; G06F 9/451; G06F 3/017; G06F 2203/04803; H04M 3/53333; H04M 1/7258; H04M 2250/60; H04L 63/104;
(Continued)

(56) References Cited

U.S. PATENT DOCUMENTS

| | | | |
|---|---|---|---|
| 9,350,845 B2 * | 5/2016 | Vendrow | H04M 1/663 |
| 2002/0090927 A1 * | 7/2002 | Allande | H04M 15/62 |
| | | | 455/408 |

(Continued)

*Primary Examiner* — Maryam M Ipakchi

(57) ABSTRACT

An exemplary multi-line communication system presents a single on-screen user interface on a communication device. The communication device is configured to conduct communication sessions over both a first communication line associated with a first mobile directory number ("MDN") and a second communication line associated with a second MDN. Within the user interface, the multi-line communication system presents an aggregated communication history including communication records representative of communication sessions associated with both the first and the second communication lines. The multi-line communication system detects a user action with respect to a communication record within the aggregated communication history, determines that the communication session represented by the communication record is associated with the first communication line, and initiates an additional communication session over the first communication line based on the determination that the communication session is associated with the first communication line. Corresponding systems and methods are also described.

17 Claims, 13 Drawing Sheets

(58) Field of Classification Search
CPC ......... H04L 51/22; H04L 51/04; H04L 51/10; H04L 51/24; H04L 67/10
See application file for complete search history.

(56) References Cited

U.S. PATENT DOCUMENTS

| | | | |
|---|---|---|---|
| 2004/0015548 A1* | 1/2004 | Lee | H04L 12/1827 709/204 |
| 2004/0152477 A1* | 8/2004 | Wu | H04L 29/06 455/466 |
| 2007/0073799 A1* | 3/2007 | Adjali | H04L 67/306 709/200 |
| 2008/0220752 A1* | 9/2008 | Forstall | G06F 3/0488 455/415 |
| 2008/0244418 A1* | 10/2008 | Manolescu | G06Q 10/00 715/753 |
| 2010/0235746 A1* | 9/2010 | Anzures | G06F 3/04855 715/723 |
| 2011/0035687 A1* | 2/2011 | Katis | H04L 12/1827 715/758 |
| 2011/0130168 A1* | 6/2011 | Vendrow | H04M 3/42008 455/556.1 |
| 2014/0040748 A1* | 2/2014 | Lemay | G10L 15/1822 715/728 |
| 2015/0017962 A1* | 1/2015 | Howard | H04M 1/72519 455/418 |
| 2017/0185252 A1* | 6/2017 | Katai | H04B 1/3833 |

* cited by examiner

METHODS AND SYSTEMS FOR MANAGING MULTIPLE COMMUNICATION LINES WITHIN A SINGLE ON-SCREEN USER INTERFACE

BACKGROUND INFORMATION

In recent years, electronics and communication technology advancements have combined to offer business and consumer users an unprecedented choice of communication capabilities and features. For example, a communication service provider may offer users an ability to manage multiple communication lines (e.g., independent channels of communication each associated with a distinctive mobile directory number ("MDN")) using just one communication device (e.g., a smartphone, a tablet device, etc.). Thus, for example, a user may use a single communication device to accept and initiate communication sessions (e.g., phone calls, messaging exchanges, etc.) on both a first communication line with a first MDN (e.g., a business communication line with a business phone number) and a second communication line with a second MDN (e.g., a personal communication line with a personal phone number).

Unfortunately, it may be difficult for a user navigate within current user interfaces to accept, initiate, conduct, and otherwise manage communication sessions over the communication lines as the user desires. For example, while a communication device may allow the user to initiate a communication session using any communication line available to the communication device, the user may wish to initiate a particular communication session using only a particular communication line. Because the user interfaces may be confusing, unpredictable, cumbersome, and/or unintuitive, the user may inadvertently initiate the communication session over a communication line other than the particular communication line desired, may worry about doing so, or may undergo unnecessary effort to avoid doing so. As a result, the user may be discouraged from taking advantage of the ability to manage multiple communication lines using the single communication device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
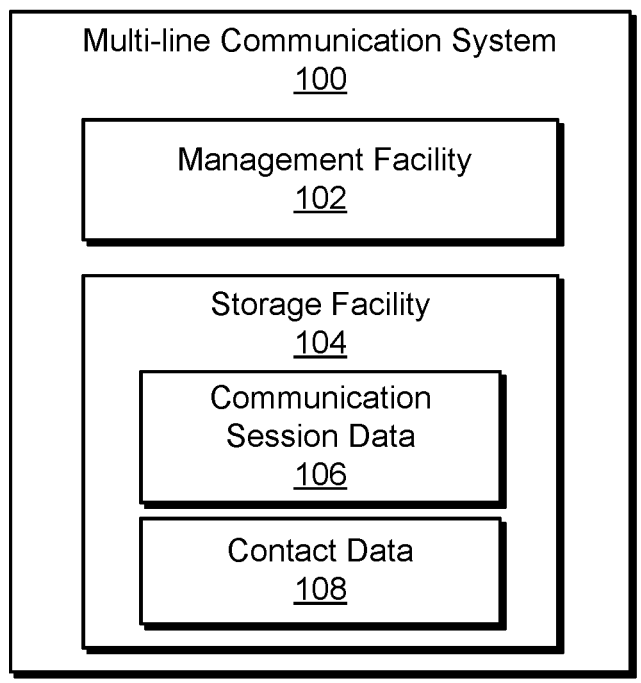
FIG. 1 illustrates an exemplary multi-line communication system configured to manage multiple communication lines on a communication device according to principles described herein.

Methods and systems for managing multiple communication lines within a single on-screen user interface are described herein. As will be illustrated below, the single on-screen user interface may be presented by a communication device (e.g., a smartphone, a tablet device, etc.) to which multiple mobile directory numbers ("MDNs") are assigned and that is configured to conduct communication sessions over a plurality of communication lines.

A communication line may include and/or be implemented as any independent channel over which communication sessions (e.g., phone calls, messaging exchanges, etc.) may be conducted. A communication line may be an analog or digital channel of communication, and may be a dedicated communication channel (e.g., a dedicated physical communication channel, a dedicated wireless frequency, etc.) or a virtual communication channel (e.g., a timeslot on a time-multiplexed structure containing a plurality of digital communication channels, etc.). In some examples, a communication line may be associated with an MDN, which may include a phone number, email address, mobile device number, mobile identification number, mobile subscription identification number, international mobile subscriber identity, and/or other unique identifier associated with (e.g., assigned to) a communication device to allow the communication device to be uniquely identified for conducting communication sessions with other communication devices. In some examples, the plurality of communication lines used by the communication device are of the same type (e.g., they may each be a phone line with a unique phone number).

Communication sessions conducted by a communication device over a communication line may include phone calls (e.g., voice calls, video calls, group calls, etc.), messaging exchanges (e.g., text messaging exchanges, multimedia messaging exchanges, group messaging exchanges, file transfers, etc.), and/or other communication sessions associated with other modes of communication. Communication sessions may be conducted one at a time or concurrently over a particular communication line in any suitable way. For example, concurrent communication sessions may be conducted over a first communication line while no communication sessions are conducted over a second communication line associated with the same communication device. Alternatively, two communication lines associated with the same communication device may each carry a single communication session, may each carry multiple concurrent communication sessions, etc.

Thus, for example, a single on-screen user interface described herein may be presented by a multi-line communication system on a communication device to which both a first MDN and a second MDN are assigned and that is configured to conduct communication sessions over a first communication line associated with the first MDN and communication sessions over a second communication line associated with the second MDN. In some embodiments, the on-screen user interface may include an aggregated communication history including one or more communication records representative of one or more communication sessions conducted by the communication device over the first communication line and one or more communication records representative of one or more communication sessions conducted by the communication device over the second communication line. The multi-line communication system may detect a user action performed by a user of the communication device with respect to a particular communication record included in the aggregated communication history and determine, in response to the user action, that the particular communication record is representative of a previous communication session (e.g., a communication session initiated and/or terminated at a point in time prior to when the aggregated communication history is presented to the user within the user interface) conducted by the communication device over the first communication line with a first additional communication device. Then, based on the determination that the particular communication record is representative of the previous communication session conducted by the communication device over the first communication line, the multi-line communication system may initiate a first additional communication session between the communication device and the first additional communication device over the first communication line.

Users are able to most fully take advantage of communication services, such as the ability to conduct communication sessions over multiple communication lines using the same communication device, when the services are managed with intuitive and logical user interfaces. Thus, by presenting a single on-screen user interface (e.g., a single on-screen user interface provided by a single application executed by the communication device) to manage multiple communication lines, the methods and systems described herein may allow users to take full advantage of multiple communication lines associated with a single communication device.

More specifically, as will be described in more detail below, as the user of the communication device initiates communication sessions with contacts and/or other users of other communication devices in a natural and intuitive way, the multi-line communication system described herein may automatically initiate the communication sessions over appropriate communication lines without the user having to perform explicit steps to select the appropriate communication lines.

As one example, a communication session may be initiated from a communication record in an aggregated communication history. A communication history may include a log of communication records of communication sessions (e.g., messaging exchange records, phone call records, transferred files, and/or other information associated with previous communication sessions) conducted over a particular communication line. An aggregated communication history may include a log of communication records of communication sessions conducted over a plurality of communications lines. Thus, in examples where a communication session is initiated from a communication record in an aggregated communication history, the multi-line communication system may automatically initiate the communication session on the same communication line over which the previous communication session associated with the communication record was conducted.

As another example, a communication session with a particular contact (e.g., a contact of the user whose information is stored by the multi-line communication system) may be initiated. The multi-line communication system may automatically initiate the communication session on a communication line explicitly associated with the contact (e.g., within stored information associated with the contact known to the multi-line communication system).

As yet another example, a communication session may be initiated at a particular time (e.g., at a particular time of day, on a particular day of the week, on a particular calendar date, etc.). The multi-line communication system may automatically initiate the communication session on a communication line deemed to be appropriate for the particular time based on one or more rules. For example, the multi-line communication system may automatically initiate certain communication sessions (e.g., communication sessions not associated with a communication record in a communication history, communication sessions not associated with a particular contact for whom contact information is stored, etc.) over a first communication line (e.g., a business communication line) during business hours, and over a second communication line (e.g., a personal communication line) after business hours and/or on weekends and holidays.

The disclosed methods and systems may also provide various other benefits that will be made apparent herein.

FIG. 1 illustrates an exemplary multi-line communication system 100 ("system 100") configured to manage multiple communication lines associated with a single communication device. As shown, system 100 may include, without limitation, a management facility 102 and a storage facility 104 selectively and communicatively coupled to one another. It will be recognized that although facilities 102 and 104 are shown to be separate facilities in FIG. 1, any of the facilities 102 and 104 may be combined into fewer facilities, such as into a single facility, or divided into more facilities as may serve a particular implementation.

Storage facility 104 may maintain communication session data 106 and contact data 108 generated and/or used by management facility 102. For example, as will be described below, communication session data 106 may include data related to communication sessions. More specifically, communication session data 106 may include, but is not limited to, data related to a communication line used for a communication session, historical data for a communication session (e.g., messages that have been exchanged), data related to a communication device and/or person with which a communication session is associated (e.g., a contact name, a phone number of the other communication device, etc.), data related to the timing of a communication session (e.g., a timestamp corresponding to when the communication session was initiated, a timestamp corresponding to when the communication session was terminated, a duration of the communication session, etc.), data associated with an on-screen user interface presented by a communication device, data representative of detected user actions with respect to the on-screen user interface, etc.

Similarly, contact data 108 may include data related to contacts (e.g., people known by one or more users of a communication device). More specifically, contact data 108 may include, but is not limited to, information associated with contacts of a user such as one or more phone numbers, street addresses, email addresses, fax numbers, webpage URLs, birthdates, other relevant dates (e.g., anniversaries, etc.), related names, social networking profiles, instant messages, etc., of the contacts. Contact data 108 may further include information representative of one or more communication lines with which each contact is associated. Storage facility 104 may maintain additional or alternative data as may serve a particular implementation. For example, storage facility 104 may store data associated with the communication device such as files downloaded to the communication device or multimedia files associated with the communication device (e.g., pictures, videos, voice recordings, etc., captured using the communication device).

Management facility 102 may perform one or more communication session management operations for communication sessions conducted over different communication lines. For example, management facility 102 may facilitate presenting an aggregated communication history including one or more communication records representative of communication sessions conducted over a first communication line and one or more communication records representative of communication sessions conducted over a second communication line. In certain examples, the aggregated communication history may further include one or more communication records representative of communication sessions conducted over one or more additional communication lines associated with the communication device.

In some examples, the aggregated communication history may include communication history information related to one or more phone calls conducted by the communication device over one or more of the communication lines (e.g., over the first and/or the second communication lines). The one or more phone calls may include a voice call, a video call, a group call, and/or any other type of phone call that the communication device may be capable of conducting. The aggregated communication history may also include communication history information related to one or more messaging exchanges conducted by the communication device over one or more of the communication lines (e.g., over the first and/or the second communication lines). The one or more messaging exchanges may include a text messaging exchange, a multimedia messaging exchange, a group messaging exchange, and/or any other type of messaging exchange that the communication device may be capable of conducting. Examples of aggregated communication histories with communication history information related to phone calls and messaging exchanges will be illustrated and discussed in more detail below.

Management facility 102 may also facilitate detecting a user action performed by a user of the communication device with respect to a particular communication record included in the aggregated communication history. For example, in embodiments where the user interface is presented on a point-and-click user interface (e.g., using a mouse, trackpad, etc.), management facility 102 may detect a user action such as that the user selects the particular communication record (e.g., by clicking or double-clicking the communication record), selects an option associated with the particular communication record (e.g., by right-clicking the communication record to bring up a menu from which an option may be selected), or another suitable user action with respect to the particular communication record.

In the same or other embodiments, the on-screen user interface may be a touchscreen interface (e.g., on a smartphone device, tablet device, personal computer with a touchscreen, etc.) and the user action performed by the user may be a user touch gesture performed with respect to a position within the touchscreen interface at which the particular communication record is presented. In various examples, the user may perform one or more of a tap gesture, a double tap gesture, a swipe gesture, a pinch gesture, a press gesture, a spread gesture, a flick gesture, a drag-and-drop gesture, a rotate gesture, or another suitable user touch gesture with respect to the particular communication record presented within the touchscreen interface or other on-screen user interface.

In various examples, the user action may include a plurality of steps such as a selection step to select the particular communication record (e.g., by clicking, touching, or swiping the communication record) and a communication session initiation step to initiate the communication session with the particular communication record selected (e.g., by selecting a communication session initiation menu item or button). Exemplary manners in which management facility 102 may detect the user action will be described in more detail below.

In response to detecting the user action, management facility 102 may determine that the particular communication record is representative of a previous communication session conducted by the communication device over a particular communication line with an additional communication device. For example, management facility 102 may determine that the previous communication session was conducted over the first communication line. To this end, management facility 102 may use data stored in communication session data 106 within storage facility 104 to determine over which communication line the particular communication session was conducted.

Based on the determination that the particular communication record is representative of the previous communication session conducted by the communication device over the particular communication line (e.g., the first communication line), management facility 102 may initiate an additional communication session between the communication device and the additional communication device over the particular communication line over which the previous communication session was conducted (e.g., the first communication line). Examples of initiating communication sessions over communication lines used by previous communication sessions with the same additional communication device will be described in more detail below.

Figure 2:
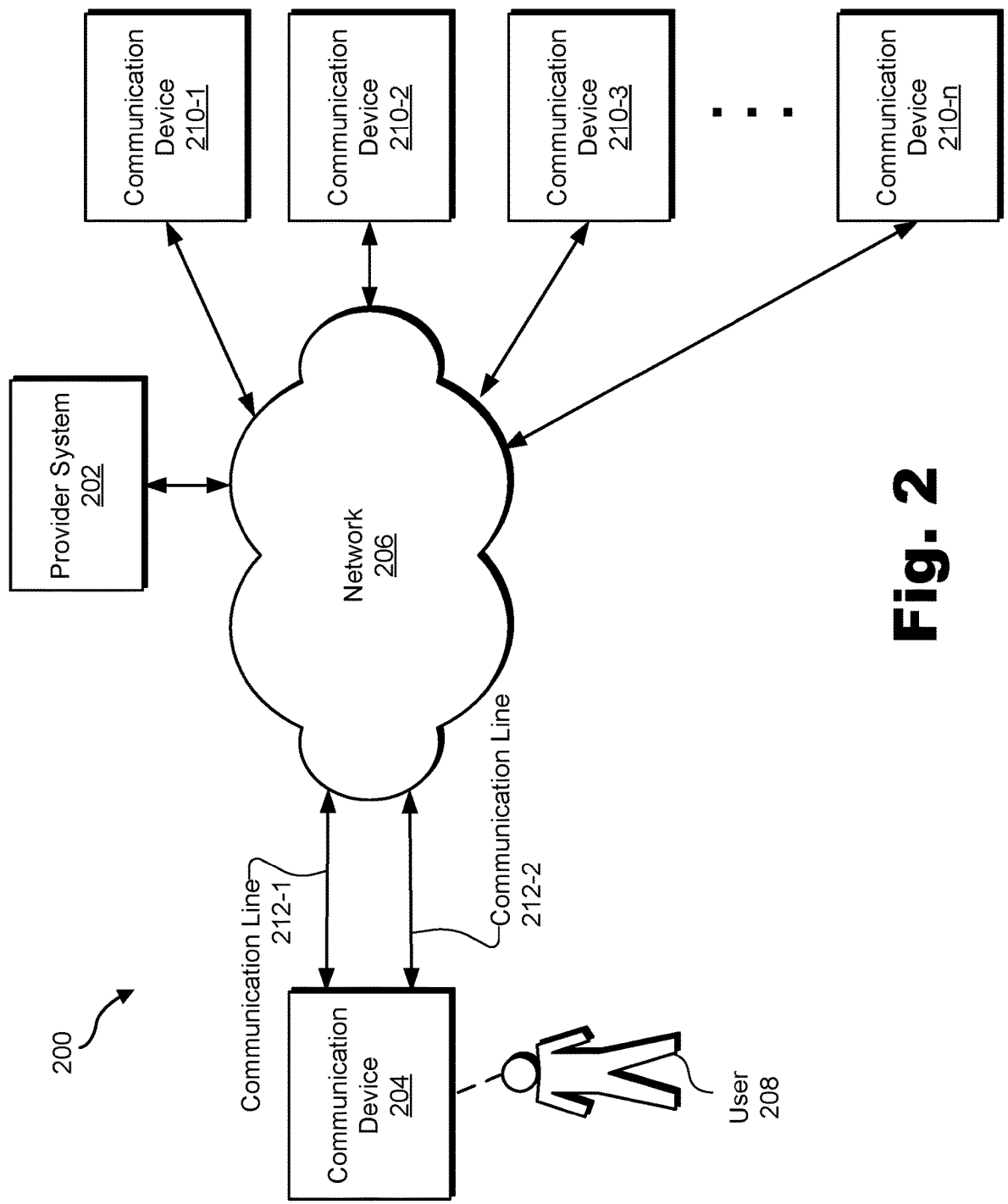
FIG. 2 illustrates an exemplary configuration that implements an exemplary multi-line communication system according to principles described herein.

FIG. 2 illustrates an exemplary configuration 200 that implements system 100. As shown, configuration 200 may include a provider system 202, a communication device 204 (e.g., a smartphone, a tablet device, etc.) associated with a user 208, and one or more additional communication devices 210 (e.g., communication devices 210-1 to 210-n) all communicatively coupled through a network 206. As illustrated, communication device 204 may be communicatively coupled to network 206 by a plurality of communication lines 212 (e.g., communication lines 212-1 and 212-2). It is noted that communication devices 210 may also be associated with respective users (not shown). For example, each of the communication devices 210 may be associated with a contact stored on communication device 204 (e.g., a person known by user 208) or another person that user 208 may wish to communicate with using communication device 204. Each of these elements will now be described in detail.

Communication device 204 may be configured to allow user 208 to conduct one or more communication sessions. To this end, as will be described below, communication device 204 may engage in communication sessions over one or more different communication lines (e.g., communication lines 212) with one or more of communication devices 210 by way of network 206. Communication device 204 and communication devices 210 may each include or be implemented by any suitable communication device such as a mobile or wireless device (e.g., a smartphone and/or a tablet device), a telephone or telephonic system, a personal computer, a set-top box device, a personal digital assistant device, a gaming device, a television device, and/or any other suitable communication device configured to engage in communication sessions (e.g., voice calls, video calls, group calls, text messaging exchanges, multimedia messaging exchanges, group messaging exchanges, etc.) with other communication devices. A communication device that implements the teachings described herein (e.g., communication device 204) may engage in communication sessions with other communication devices (e.g., communication devices 210) whether or not the other communication devices implement the teachings described herein.

Provider system 202 may be associated with (e.g., provided and/or managed by) a communication service provider (e.g., a network service provider, an application service provider, etc.) and may be configured to provide one or more communication services (e.g., voice, video, and messaging communication services, etc.) to communication device 204 and/or to communication devices 210. For example, provider system 202 may manage (e.g., connect, disconnect, track, allow, disallow, etc.) communication sessions between communication devices, such as between communication device 204 and communication devices 210. To this end, in certain embodiments provider system 202 may direct or facilitate one or more communication devices in presenting on-screen user interfaces representative of communication sessions in which the communication devices are engaged. For example, provider system 202 may provide an application that may be executed by communication device 204 and that may direct communication device 204 to present a user interface and/or perform any of the multi-line communication management operations described herein.

In other embodiments, communication devices (e.g., communication device 204 and/or one or more of communication devices 210) may manage their own respective communication sessions and/or on-screen user interfaces with little or no direction from provider system 202. For example, communication device 204 may be configured to manage the communication sessions in which communication device 204 is engaged and/or to present the user interface independently to allow user 208 to initiate and engage in communication sessions.

Accordingly, in some examples, system 100 is entirely implemented by communication device 204 while in other examples system 100 may be entirely implemented by provider system 202. In yet other examples, system 100 may be implemented by a combination of communication device 204 and provider system 202.

In some examples, provider system 202 may manage (e.g., track, allow, disallow, route, etc.) network traffic (i.e., data) that flows through network 206. To this end, provider system 202 may be implemented by one or more gateways, routers, servers (e.g., domain name system ("DNS") servers and/or billing management servers), and/or other network components as may serve a particular implementation.

Communication device 204, provider system 202, and communication devices 210 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, communication device 204 may be communicatively coupled with network 206 by one or more communication lines 212 (e.g., communication lines 212-1 and 212-2) such that communication device 204, provider system 202, and communication devices 210 may all intercommunicate by way of network 206. While two communication lines 212 are illustrated in FIG. 2 between communication device 204 and network 206, it will be understood that communication device 204 may be associated with more or fewer communication lines. Communication lines 212 may each be associated with an MDN (e.g., a unique phone number, email address, etc.). For example, communication line 212-1 may be associated with a personal MDN (e.g., a personal phone number) for user 208, while communication line 212-2 may be associated with a business MDN (e.g., a work phone number) for user 208.

Network 206 may include any provider-specific network (e.g., a wireless carrier network or a mobile telephone network), the Internet, or any other suitable network. Data may flow between communication device 204, provider system 202, and communication devices 210 using any suitable communication technologies, devices, media, and protocols as may serve a particular implementation. While only one network 206 is shown in FIG. 2, it will be recognized that communication device 204 may communicate with provider system 202 and/or communication devices 210 by way of multiple interconnected networks in accordance with the methods and systems described herein as may serve a particular implementation.

System 100 (e.g., as implemented in configuration 200) may facilitate the management of communication sessions on multiple communication lines in various ways. As such, exemplary manners by which system 100 may allow a user (e.g., user 208) to manage communication sessions being conducted over different communication lines (e.g., communication lines 212) from a single on-screen user interface presented on a communication device (e.g., communication device 204) will now be described.

Figure 3:
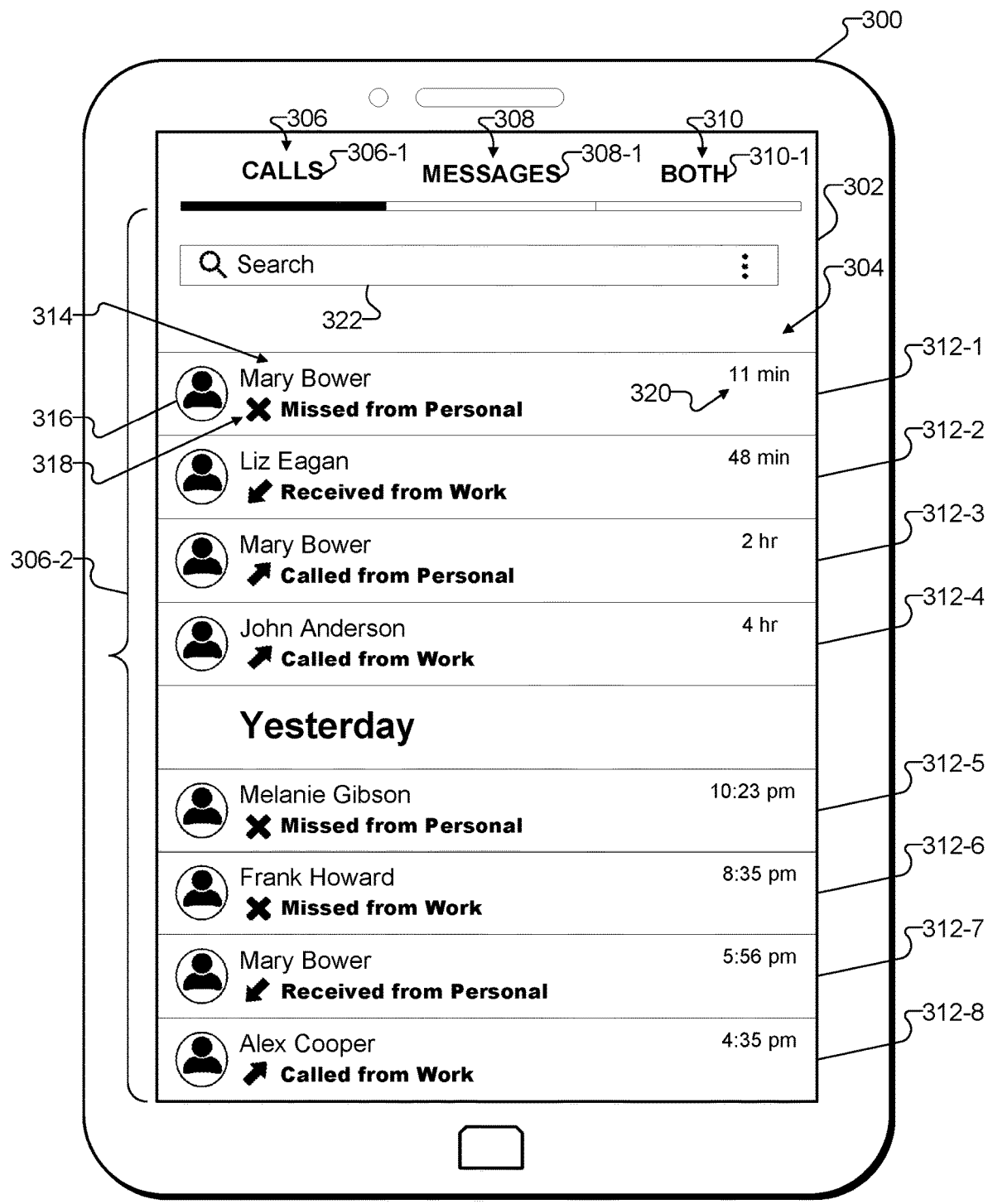
FIGS. 3-5 show an exemplary communication device on which an exemplary on-screen user interface presents an exemplary aggregated communication history associated with multiple communication lines according to principles described herein.
Figure 4:
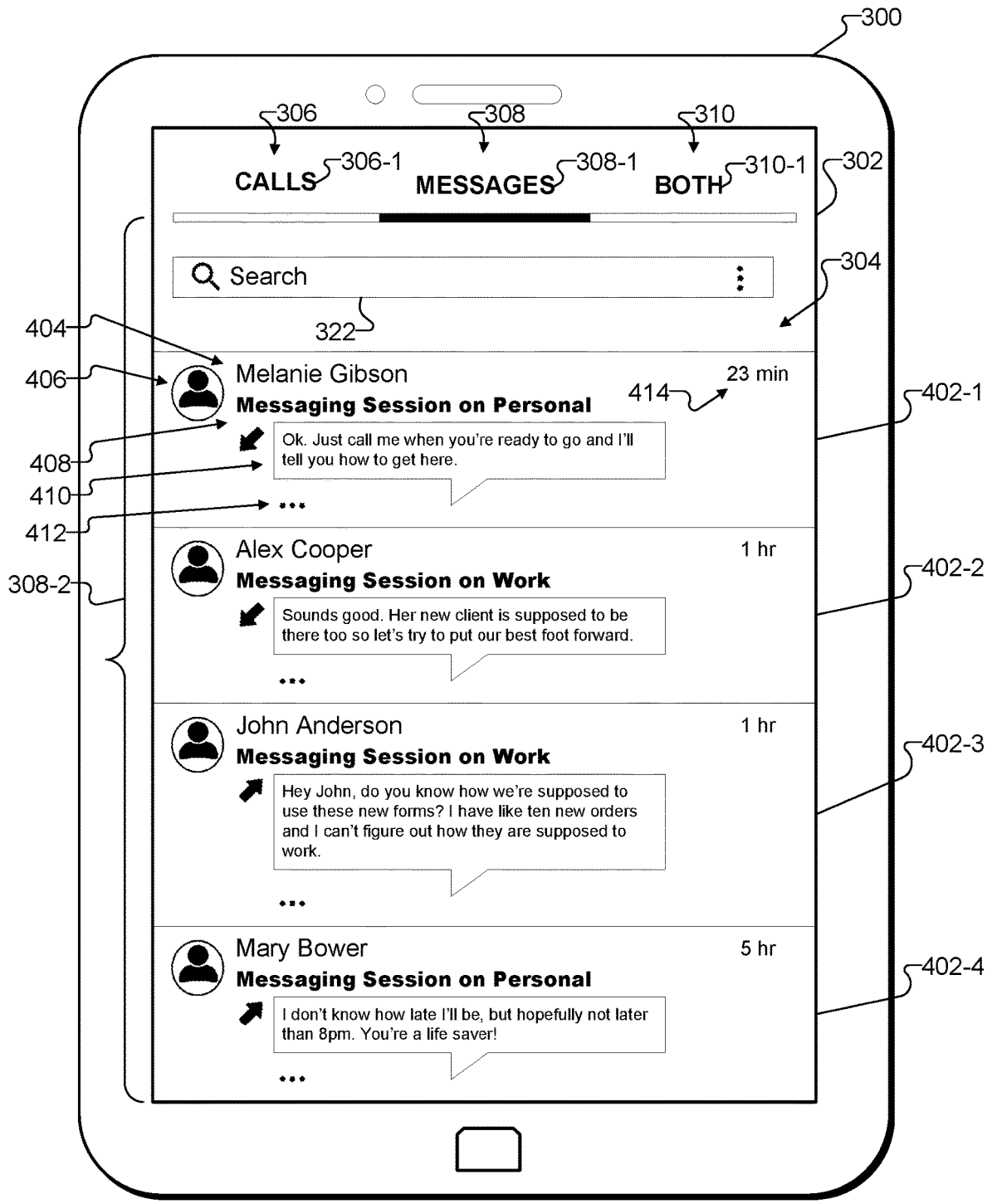
Figure 5:
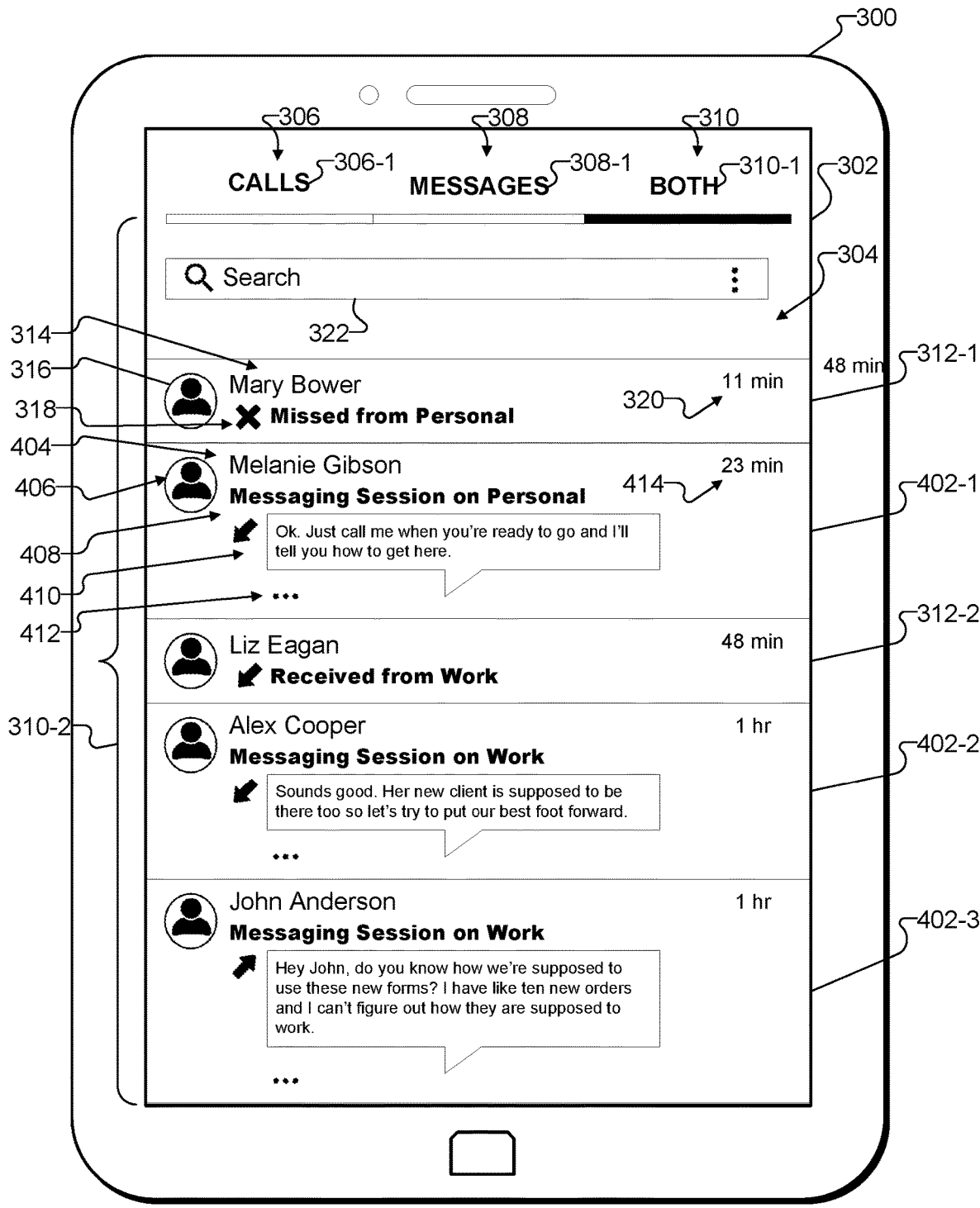

FIGS. 3-5 show an exemplary communication device 300 on which an exemplary on-screen user interface 302 is presented. In particular, FIGS. 3-5 illustrate various views of an exemplary aggregated communication history 304 associated with multiple communication lines presented within user interface 302. As will be described in more detail below, aggregated communication history 304 includes various communication records representative of communication sessions conducted by communication device 300 over multiple communication lines (e.g., communication lines 212 shown in FIG. 2). Aggregated communication history 304 may include one or more tabs to allow a user to view communication records associated with communication sessions of a particular communication mode (e.g., phone calls, messaging exchanges, etc.).

As described and illustrated herein, tabs may be implemented within user interface 302 to allow the user of communication device 300 to easily and intuitively switch between different views or functions within a user interface (e.g., user interface 302). In some examples, tabs used within user interface 302 may include a first element referred to as a tab label and a second element referred to as a content pane. The tab label of a tab may be visible alongside tab labels of other tabs even when the tab is not currently selected and/or the content pane associated with the tab is not being presented. Conversely, the content pane of the tab may include most or all of the content and/or functionality of the tab, and may be hidden from view except when the tab is selected. As such, the user may select a tab from a selection of tab labels that are presented continuously within user interface 302. After selecting a particular tab by selecting the tab label, the content pane of the tab may be presented, allowing the user to view the content and/or use the functionality of the particular tab selected.

For example, in FIGS. 3-5, "CALLS" tab 306, "MESSAGES" tab 308, and "BOTH" tab 310 may each be associated with a tab label (e.g., tab labels 306-1, 308-1, and 310-1, respectively) which may be presented continuously towards the top of aggregated communication history 304 within user interface 302. "CALLS" tab 306, "MESSAGES" tab 308, and "BOTH" tab 310 may also each be associated with a content pane (e.g., content panes 306-2, 308-2, and 310-2, respectively) which may be hidden except when a tab with which the content pane is associated is currently selected.

Accordingly, the user may select "CALLS" tab 306 by selecting tab label 306-1 to view communication records associated with phone calls conducted by communication device 300 within content pane 306-2. "CALLS" tab 306 will be described in more detail below in relation to FIG. 3. The user may select "MESSAGES" tab 308 by selecting tab label 308-1 to view communication records associated with messaging exchanges conducted by communication device 300 within content pane 308-2. "MESSAGES" tab 308 will be described in more detail below in relation to FIG. 4. The user may select "BOTH" tab 310 to view communication records associated with both phone calls and messaging exchanges conducted by communication device 300 within content pane 310-2. "BOTH" tab 310 will be described in more detail below in relation to FIG. 5.

Referring now to FIG. 3 in particular, FIG. 3 illustrates aggregated communication history 304 when "CALLS" tab 306 is selected. As shown, tab label 306-1 is underscored by a solid bar to indicate that "CALLS" tab 306 is selected, while tab labels 308-1 and 310-1 (associated with "MESSAGES" tab 308 and "BOTH" tab 310, respectively) are both underscored by a hollow bar to indicate that "MESSAGES" tab 308 and "BOTH" tab 310 are not selected. Moreover, as shown in FIG. 3, content pane 306-2 is presented because "CALLS" tab 306 is selected, while content panes 308-2 and 310-2 (associated with "MESSAGES" tab 308 and "BOTH" tab 310, respectively) are hidden.

As shown, content pane 306-2 includes a plurality of phone call communication records 312 (e.g., communication records 312-1 through 312-8). Communication records 312 may each be representative of a phone call conducted by communication device 300 over a particular communication line. For example, communication records 312 may each be representative of at least one of a voice call, a video call, and a group call conducted over either a personal communication line associated with communication device 300 (e.g., communication line 212-1 of FIG. 2) or a business communication line associated with communication device 300 (e.g., communication line 212-2 of FIG. 2).

FIG. 3 illustrates certain elements of communication record 312-1, including a contact name 314, a contact icon 316, an initiation indicator 318, and a timestamp 320. In various embodiments, more or fewer elements of a phone call communication record may be included within communication record 312-1. As shown, each of communication records 312-2 through 312-8 may include similar or identical elements as communication record 312-1. Each of the elements presented within communication record 312-1 will now be described.

Contact name 314 may represent a name of a contact (e.g., a contact named "Mary Bower") or other person associated with the communication device with which the phone call represented by communication record 312-1 was conducted. In various implementations, system 100 may store contact name 314 within storage facility 104 in FIG. 1 (e.g., within communication session data 106 and/or contact data 108). In some examples, system 100 may not have data stored representative of a contact name associated with a particular communication session. For example, if the user initiates a phone call with an MDN not associated with any contact within a user directory stored within contact data 108, system 100 may not know a contact name associated with the MDN. In this case, contact name 314 may say "Unknown" or may be blank.

Contact icon 316 may include a picture and/or another suitable icon representative of a contact (e.g., Mary Bower) or other person associated with the communication device with which the phone call represented by communication record 312-1 was conducted. In various implementations, system 100 may store contact icon 316 within storage facility 104 in FIG. 1 (e.g., within communication session data 106 and/or contact data 108). In some examples, the system 100 may not have data stored representative of a contact icon associated with a particular communication session. For example, if the user initiates a phone call with an MDN not associated with any contact within a user directory stored within contact data 108, system 100 may not have a contact icon associated with the MDN. Similarly, certain contacts stored within contact data 108 may include certain information (e.g., a name and an MDN) but may not include a picture or other particular icon associated with the contact. In examples where no picture or other icon is specifically associated with the communication device or MDN represented by communication record 312-1, a default contact icon may be used or contact icon 316 may be blank.

Initiation indicator 318 may indicate information related to the initiation of the phone call represented within communication record 312-1. For example, initiation indicator 318 may include an indication of whether a phone call was initiated by the user of communication device 300 or by the other person (e.g., the contact or other person represented by contact name 314 and contact icon 316), an indication of whether the phone call was accepted (e.g., answered) by the receiving party, an indication of which communication line the phone call was carried over, and/or any other suitable information related to the initiation of the phone call. As such, initiation indicator 318 may include a simple icon, a verbal description, and/or any other suitable indication of the initiation of the phone call (e.g., using color, design style, highlighting, etc.).

For example, as shown in FIG. 3, initiation indicator 318 includes an 'X'-shaped icon with the description "Missed from Personal" to indicate that the phone call was an incoming call (e.g., a phone call initiated by the contact named Mary Bower) that was carried over a "Personal" communication line (e.g., communication line 212-1 in FIG. 2) and was missed (e.g., not accepted) by the user of communication device 300. Other initiation indicators shown in FIG. 3 indicate other initiation information for other phone calls. For example, the initiation indicator shown in communication record 312-2 includes an arrow icon pointing down with the description "Received from Work" to indicate that a phone call with a contact named "Liz Eagan" was an incoming call over a "Work" communication line (e.g., communication line 212-2 in FIG. 2) that was accepted. As another example, the initiation indicator shown in communication record 312-3 includes an arrow icon pointing up with the description "Called from Personal" to indicate that a phone call to Mary Bower was initiated over the "Personal" communication line.

Timestamp 320 may indicate information related to when the phone call represented by communication record 312-1 was initiated. As illustrated, timestamp 320 may indicate a relative time (e.g., relative to a current time) that the phone call was initiated (e.g., 11 minutes ago). Alternatively, as illustrated by the timestamp associated with communication record 312-5, a timestamp may indicate an absolute time and/or date (e.g. 10:23 pm) if a relative time is determined to be less suitable (e.g., for a phone call that occurred on a day other than the current day). In other examples, timestamp 320 may indicate other timing information related to the phone call. For example, timestamp 320 may indicate when the phone call was received, when the phone call was terminated, the duration of the phone call, etc.

Referring now to FIG. 4 in particular, FIG. 4 illustrates aggregated communication history 304 when "MESSAGES" tab 308 is selected. As shown, tab label 308-1 is underscored by a solid bar to indicate that "MESSAGES" tab 308 is selected, while tab labels 306-1 and 310-1 (associated with "CALLS" tab 306 and "BOTH" tab 310, respectively) are both underscored by a hollow bar to indicate that "CALLS" tab 306 and "BOTH" tab 310 are not selected. Moreover, as shown in FIG. 4, content pane 308-2 is presented because "MESSAGES" tab 308 is selected, while content panes 306-2 and 310-2 (associated with "CALLS" tab 306 and "BOTH" tab 310, respectively) are hidden.

As shown, content pane 308-2 includes a plurality of messaging exchange communication records 402 (e.g., communication records 402-1 through 402-4). Communication records 402 may each be representative of a messaging exchange conducted by communication device 300 over a particular communication line. For example, communication records 402 may each be representative of at least one of a text messaging exchange, a multimedia messaging exchange, and a group messaging exchange conducted over either the personal communication line or the business communication line associated with communication device 300.

FIG. 4 illustrates certain elements of communication record 402-1, including a contact name 404, a contact icon 406, an initiation indicator 408, a message 410, an expansion option 412, and a timestamp 414. In various embodiments, more or fewer elements of a messaging exchange communication record may be included within communication record 402-1. As shown, each of communication records 402-2 through 402-4 may include the same or identical elements as communication record 402-1. Each of the elements presented within communication record 402-1 will now be described.

Contact name 404 may represent a name of a contact (e.g., a contact named "Melanie Gibson") or other person associated with the communication device with which the messaging exchange represented by communication record 402-1 was conducted. In various implementations, system 100 may store contact name 404 within storage facility 104 in FIG. 1 (e.g., within communication session data 106 and/or contact data 108). In some examples, system 100 may not have data stored representative of a contact name associated with a particular communication session. For example, if the user initiates a messaging exchange with an MDN not associated with any contact within a user directory stored within contact data 108, system 100 may not know a contact name associated with the MDN. In this case, contact name 404 may say "Unknown" or may be blank.

Contact icon 406 may include a picture and/or another suitable icon representative of a contact (e.g., Melanie Gibson) or other person associated with the communication device with which the phone call represented by communication record 402-1 was conducted. In various implementations, system 100 may store contact icon 406 within storage facility 104 in FIG. 1 (e.g., within communication session data 106 and/or contact data 108). In some examples, system 100 may not have data stored representative of a contact icon associated with a particular communication session. For example, if the user initiates a messaging exchange with an MDN not associated with any contact within a user directory stored within contact data 108, system 100 may not have a contact icon associated with the MDN. Similarly, certain contacts stored within contact data 108 may include certain information (e.g., a name and an MDN) but not have a picture or other particular icon associated with the contact. In examples where no picture or other icon is specifically associated with the communication device or MDN represented by communication record 402-1, a default contact icon may be used or contact icon 406 may be blank.

Initiation indicator 408 may indicate information related to the initiation of the messaging exchange represented within communication record 402-1. For example, initiation indicator 408 may include an indication of whether a particular message (e.g., a most recently exchanged message) was initiated by the user of communication device 300 or by the other person (e.g., the contact or other person represented by contact name 404 and contact icon 406), an indication of which communication line the messaging exchange was carried over, and any other suitable information related to the messaging exchange or the initiation of a message within the messaging exchange. As such, initiation indicator 408 may include a simple icon, a verbal description, and/or any other suitable indication of the messaging exchange or the initiation of a message within the messaging exchange (e.g., using color, design style, highlighting, etc.).

For example, as shown in FIG. 4, initiation indicator 408 includes an arrow icon with the description "Messaging Session on Personal" to indicate that a most recently exchanged message (e.g., message 410) was an incoming message (e.g., a message initiated by the contact, Melanie Gibson) that was carried over the "Personal" communication line. Other initiation indicators shown in FIG. 4 indicate other initiation information for other phone calls. For example, the initiation indicator shown in communication record 402-3 includes an arrow icon pointing up with the description "Messaging Session on Work" to indicate that a most recently exchanged message in a messaging exchange with a contact named "John Anderson" was an outgoing message (e.g., a message initiated by the user of communication device 300) carried over the "Work" communication line.

As shown, message 410 may include full or partial text from one or more messages exchanged in the messaging exchange represented by communication record 402-1. In certain examples, message 410 may be a most recently exchanged message between the user of communication device 300 and the contact or other person associated with communication record 402-1.

In certain examples, communication record 402-1 may include more information than is convenient or possible to present on content pane 308-2 within aggregated communication history 304. For example, message 410 may be too long to present conveniently within communication record 402-1, or the messaging exchange associated with communication record 402-1 may include additional messages (e.g., messages related to message 410). As such, communication record 402-1 may also include an expansion option 412 to allow the user to use a larger portion of user interface 302 (e.g., all of content pane 308-2) to display the additional information associated with communication record 402-1.

Timestamp 414 may indicate information related to when a particular message (e.g., message 410) within the messaging exchange represented by communication record 402-1 was initiated. For example, timestamp 414 may indicate information related to when a most recently exchanged message within the messaging exchange was initiated. As illustrated, timestamp 414 may indicate a relative time (e.g., relative to a current time) that the message was initiated (e.g., 23 minutes ago). Alternatively, timestamp 414 may indicate an absolute time and/or date (e.g. 9:18 am) when a relative time is determined to be less suitable (e.g., for message exchanged on a previous day). In other examples, timestamp 414 may indicate other timing information related to the messaging exchange.

Referring now to FIG. 5 in particular, FIG. 5 illustrates aggregated communication history 304 when "BOTH" tab 310 is selected. As shown, tab label 310-1 is underscored by a solid bar to indicate that "BOTH" tab 310 is selected, while tab labels 306-1 and 308-1 (associated with "CALLS" tab 306 and "MESSAGES" tab 308, respectively) are both underscored by a hollow bar to indicate that "CALLS" tab 306 and "MESSAGES" tab 308 are not selected. Moreover, as shown in FIG. 5, content pane 310-2 is presented because "BOTH" tab 310 is selected, while content panes 306-2 and 308-2 (associated with "CALLS" tab 306 and "MESSAGES" tab 308, respectively) are hidden.

As shown, content pane 310-2 includes certain phone call communication records 312 (e.g., communication records 312-1 and 312-2) and certain messaging exchange communication records 402 (e.g., communication records 402-1 through 402-3). Communication records 312 were discussed in detail above in relation to FIG. 3 and communication records 402 were discussed in detail above in relation to FIG. 4.

Referring again to FIGS. 3-5 collectively, system 100 may detect a user action performed by a user of communication device 300 with respect to a particular communication record included in aggregated communication history 304. For example, the user action may be performed with respect to one of communication records 312 shown in FIGS. 3 and/or 5 or one of communication records 402 shown in FIGS. 4 and/or 5.

For example, the user action may comprise a click or tap gesture. If the particular communication record with respect to which the user action is performed is a messaging exchange communication record (e.g., one of communication records 402 shown in FIGS. 4 and/or 5), system 100 may associate the user action with initiating a messaging exchange. Conversely, if the particular communication record with respect to which the user action is performed is a phone call communication record (e.g., one of communication records 312 shown in FIGS. 3 and/or 5), system 100 may associate the user action with initiating a phone call.

In the same or other examples, the user action may comprise a swipe gesture in one of a first lateral direction (e.g., to the left) and a second lateral direction (e.g., to the right) with respect to the particular communication record. Regardless of whether the particular communication record is a phone call communication record (e.g., communication records 312) or a messaging exchange communication record (e.g., communication records 402), a swipe gesture in a particular lateral direction (e.g., a left swipe gesture or a right swipe gesture) may be associated with the initiation of a communication session of a particular communication mode (e.g., a phone call or a messaging exchange). For example, a user may perform a swipe gesture in a first lateral direction (e.g., to the left) with respect to one of communication records 312 or 402 to indicate that a messaging exchange will be initiated with the contact or other person with whom the communication record is associated. Similarly, the user may perform a swipe gesture in a second lateral direction (e.g., to the right) with respect to one of communication records 312 or 402 to indicate that a phone call will be initiated with the contact or other person with whom the communication record is associated.

In some examples, the user swipe gesture may automatically cause system 100 to initiate the communication session (e.g., the phone call or messaging exchange), while in other examples one or more additional steps may be performed by the user before the communication session is initiated. For example, a swipe gesture with respect to the communication record in the first lateral direction may cause system 100 to present a messaging exchange initiation button, which, when selected, may cause system 100 to present a user input panel to allow the user to input (e.g., type) and exchange a message. Similarly, a swipe gesture with respect to the communication record in the second lateral direction may cause system 100 to present a phone call initiation button, which, when selected, may cause system 100 to initiate a phone call with the contact or other person associated with the communication record.

Figure 6:
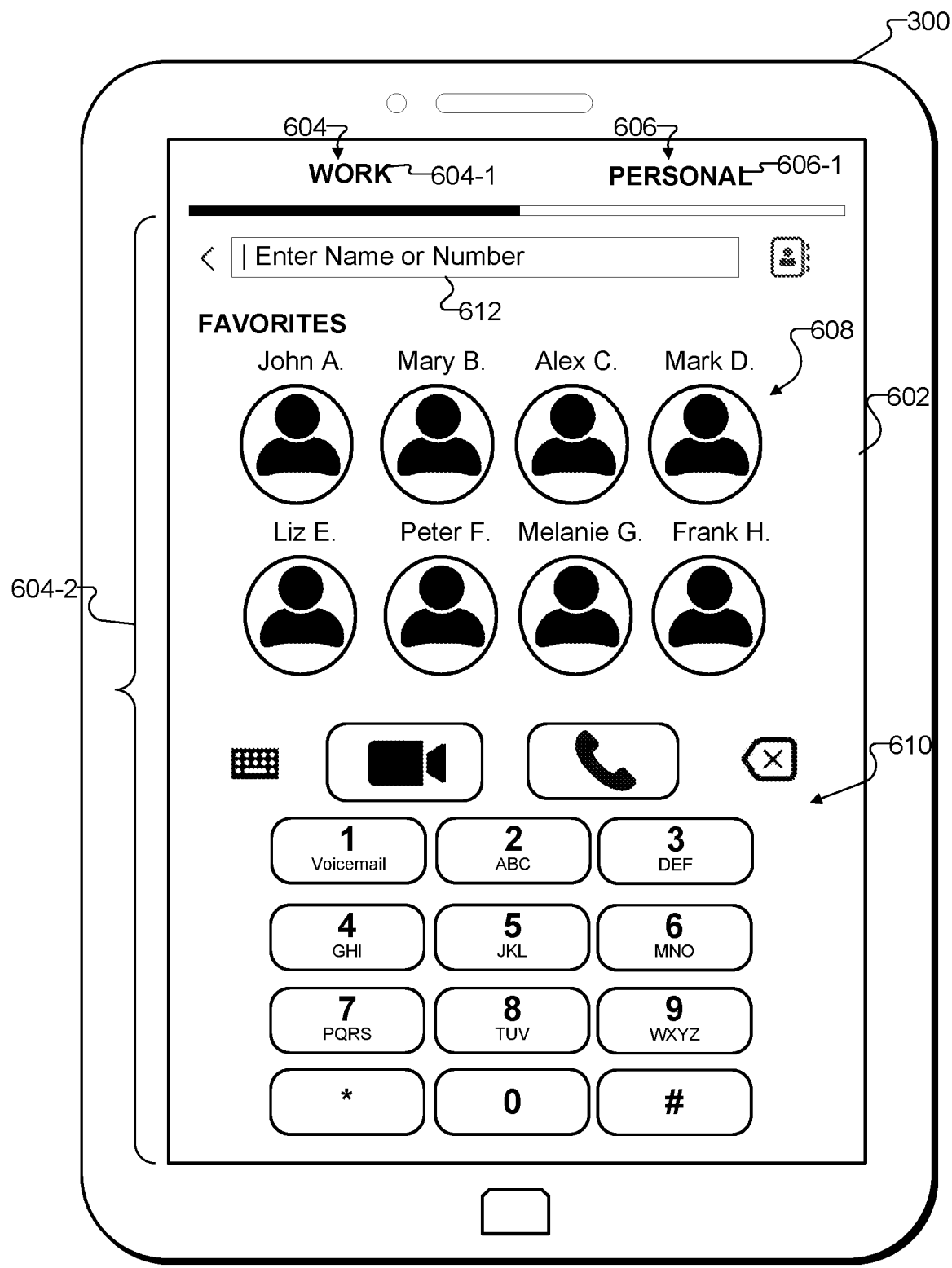
FIGS. 6-8 show an exemplary communication device on which an exemplary on-screen user interface allows a user to manage communication sessions conducted over multiple communication lines according to principles described herein.
Figure 7:
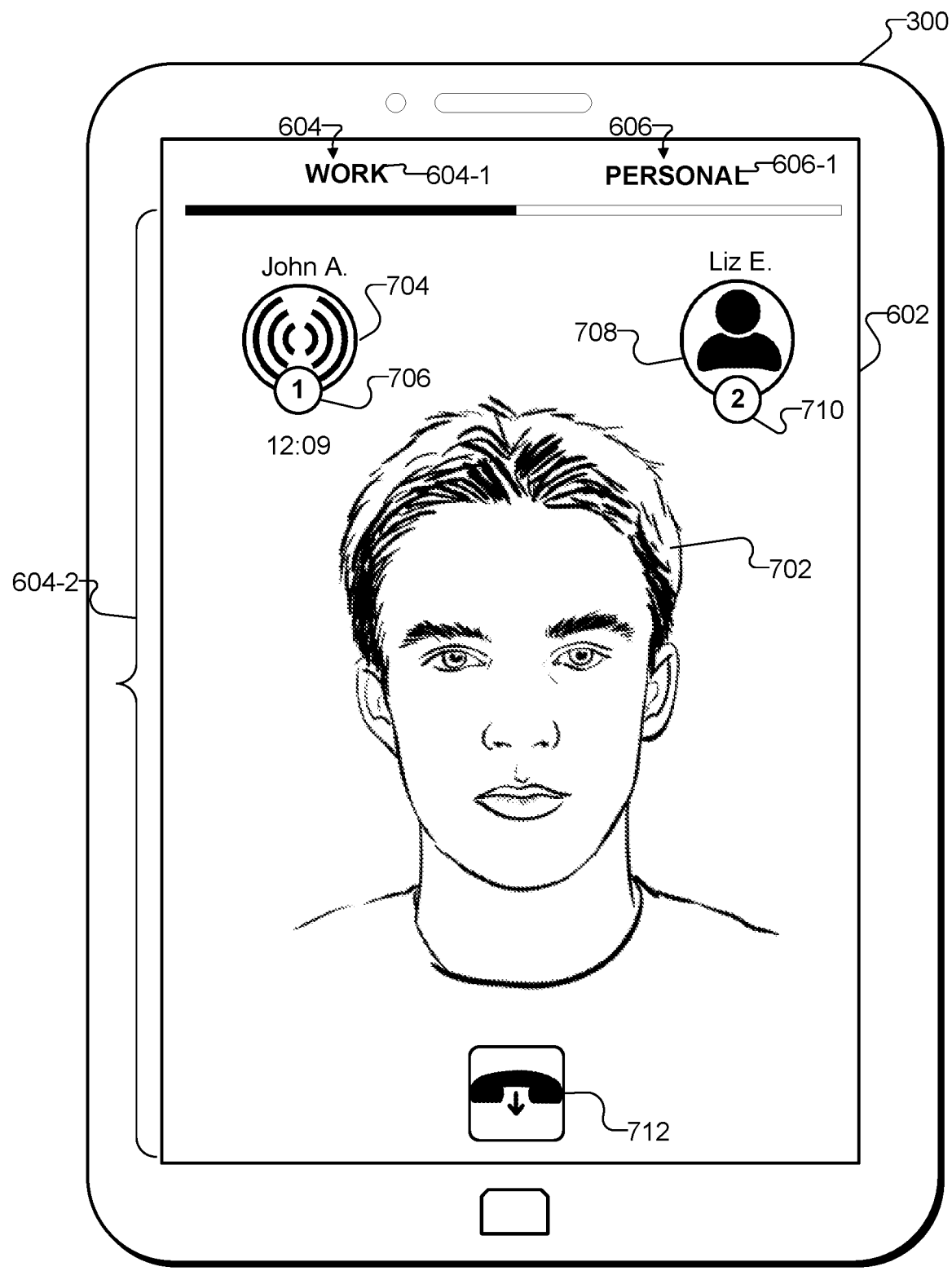
Figure 8:
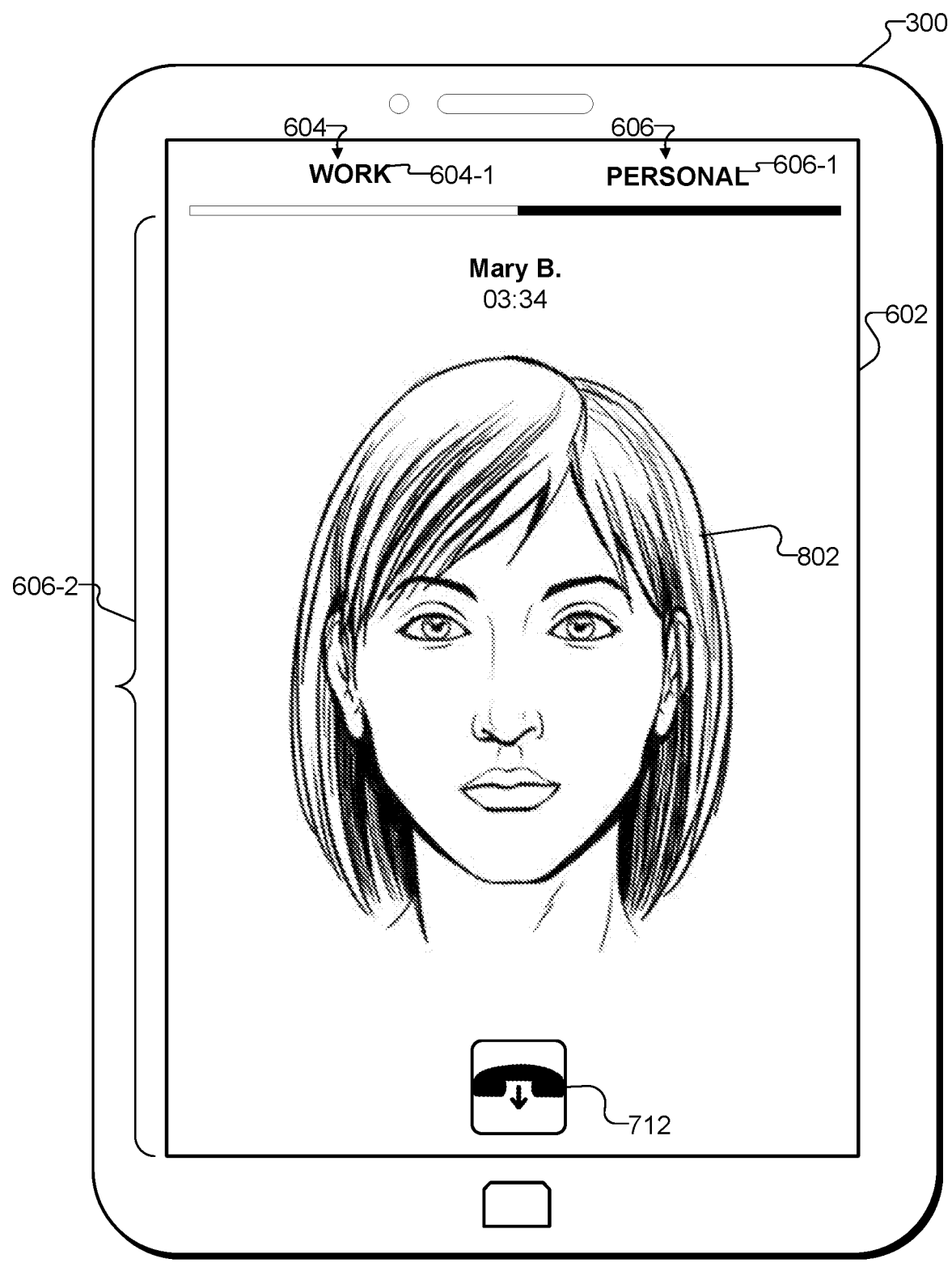

FIGS. 6-8 show exemplary communication device 300 on which an exemplary on-screen user interface 602 allows a user to manage communication sessions conducted over multiple communication lines. User interface 602 may be configured to allow a user of communication device 300 to initiate one or more communication sessions with one or more selected contacts and/or with other users of other communication devices (e.g., users of communication devices 210 of FIG. 2) using any of a plurality of communication lines associated with communication device 300. Moreover, user interface 602 may allow the user to accept and conduct communication sessions initiated by other communication devices on any of the plurality of communication lines, as well as to manage communication sessions on any of the plurality of communication lines in which communication device 300 is engaged.

To this end, user interface 602 may include tabs (e.g., tabs with similar functionality to "CALLS" tab 306, "MESSAGES" tab 308, and "BOTH" tab 310 described above in relation to FIGS. 3-5) associated with each of the plurality of communication lines. Specifically, user interface 602 may include a "WORK" tab 604 associated with a first communication line (e.g., a business communication line associated with a business MDN) and a "PERSONAL" tab 606 associated with a second communication line (e.g., a personal communication line associated with a personal MDN). As shown, "WORK" tab 604 and "PERSONAL" tab 606 may each have a tab label (e.g., tab labels 604-1 and 606-1, respectively) which may be presented continuously towards the top of user interface 602. "WORK" tab 604 and "PERSONAL" tab 606 may also each be associated with a content pane (e.g., content panes 604-2 and 606-2, respectively), which may be hidden except when the tab is currently selected.

Referring now to FIG. 6 in particular, content pane 604-2 of "WORK" tab 604 illustrates various elements that may be presented to allow the user to initiate and/or manage communication sessions conducted over the communication line associated with the currently selected tab. For example, FIG. 6 illustrates within content pane 604-2 a plurality of selectable contact items 608 each representative of a contact of the user, a user input panel 610 configured to allow the user to initiate a communication session (e.g., a phone call or messaging exchange), and a contact selection field 612. It will be understood that content pane 606-2 of "PERSONAL" tab 606 (hidden in FIG. 6) may include similar or the same elements illustrated within content pane 604-2 of "WORK" tab 604. These elements will now be described.

As shown, the plurality of selectable contact items 608 within content pane 604-2 may each represent a contact of the user. For example, selectable contact items 608 may represent all the contacts within a contact directory (e.g., stored within contact data 108 in FIG. 1) or only contacts specifically associated with a business of the user (e.g., business colleagues, clients, suppliers, and/or other business contacts of the user). As such, each selectable contact item 608 may include a picture of the contact it represents or an icon that is associated with the contact. Additionally, each selectable contact item 608 may be labeled with a full or abbreviated name of the contact it represents (e.g., John A., Mary B., Alex C., Mark D., Liz E., Peter F., Melanie G., and Frank H.).

User interface 602 may be configured to allow users to browse, search, filter, and otherwise display and select contacts in any suitable way. For example, standard user touch gestures and user interface features may be employed to browse additional selectable contact items 608 representative of additional contacts within content pane 604-2. For example, the user may perform a user touch gesture (e.g., by swiping up and/or down) with respect to content pane 604-2 to scroll through additional selectable contact items 608 representing additional contacts of the user (e.g., within a contact directory stored within contact data 108). Additionally, contacts may be filtered and/or searched for by name, number, or other identifying information associated with the contacts. For example, contact selection field 612 may allow a user to input a full or partial name of a contact, a full or partial phone number of a contact, and/or other identifying information associated with one or more contacts to filter and/or search through contacts associated with communication device 300. Additionally, other user interface features that facilitate filtering, searching, and/or selecting contacts may also be included within contact communication pane as may serve a particular implementation.

Content pane 604-2 may further include user input panel 610 to allow the user to initiate a communication session. For example, as shown, user input panel 610 may be configured to facilitate the initiation of a phone call (e.g., a voice call, a video call, a group call, etc.). As such, user input panel 610 may include a call initiation panel (e.g., a numeric dialing keypad for manual entry of an MDN, a list of selectable items representing preprogrammed MDNs, etc.), a voice call initiation button, and a video call initiation button configured to allow the user to initiate a phone call. In other examples, user input panel 610 may include a user input panel configured to facilitate the initiation of a messaging exchange (e.g., a text messaging exchange, a multimedia messaging exchange, a group messaging exchange, etc.). A user input panel configured to facilitate the initiation of a messaging exchange may include elements such as an alphabetic typing keypad (e.g., a QWERTY keyboard) for inputting text, an attachment selection icon (e.g., to allow the user to attach a picture or other multimedia file to a message), and a message editing stage (e.g., to allow the user to view and edit a message being prepared).

Referring now to FIG. 7 in particular, another view of user interface 602 is illustrated. Specifically, FIG. 7 shows content pane 604-2 of "WORK" tab 604 when a communication session (e.g., a phone call) is ongoing over the first communication line (e.g., the business communication line associated with the business MDN).

As shown, user interface 602 may be configured to allow the user to manage a plurality of communication sessions in which communication device 300 is concurrently engaged on a single communication line (e.g., the business communication line associated with the business MDN). To this end, content pane 604-2 may include a background 702, a first session icon 704 associated with a first session number 706, a second session icon 708 associated with a second session number 710, and a session control 712. Each of these elements will now be described in detail.

Background 702 may be presented as a background of content pane 604-2 of "WORK" tab 604 upon which other elements of content pane 604-2 may be arranged, as shown. Background 702 may be representative of a communication session such as a currently active communication session or a last communication session to be active. For example, as illustrated in FIG. 7, communication device 300 may be currently engaged in an active communication session with a person named "John A.," who may be associated with another communication device (e.g., communication device 210-1 illustrated in FIG. 2). As such, a picture of John A. may be included within background 702, as shown. Various other backgrounds may be implemented to represent a currently on-hold communication session, a currently parked communication session, a group communication session, another type or status of communication session, etc.

As shown, content pane 604-2 of "WORK" tab 604 may also include one more session icons (e.g., session icons 704 and 708) representative of concurrent communication sessions being conducted over the first communication line. Each session icon may visually indicate information about the communication session represented by the session icon. For example, session icon 704 may indicate that an active phone call with John A. is being conducted, and session icon 708 may indicate that a non-active (e.g., on-hold) phone call with a person named "Liz E." is also being conducted over the same communication line (e.g., the business communication line associated with the business MDN).

Content pane 604-2 may also include one or more dedicated session controls that may be associated with a particular communication session and/or with a currently active communication session. For example, session control 712 illustrated in FIG. 7 may be selected (e.g., clicked or tapped)

by the user to terminate a currently active communication session, such as the communication session with John A. shown in the example of FIG. 7. While not illustrated in FIG. 7, other session controls may be employed by user interface 602 to allow the user, for example, to control the volume of a communication session, to mute a communication session (e.g., stop sharing audio and/or video information), to activate speaker mode, to present a dialing keypad (e.g., with which to enter touch-tone information), to put an active communication session on hold, to park an active communication session, to transfer an active communication session, to initiate a new and/or additional communication session, to switch the camera actively being used by a video communication session, to switch from one type of communication to another (e.g., from a voice call to a video call, from a voice call to a messaging exchange, etc.), to send a text message, to attach a file or a location to a multimedia message, etc.

Referring now to FIG. 8 in particular, another view of user interface 602 is illustrated. Specifically, FIG. 8 shows content pane 606-2 of "PERSONAL" tab 606 when a communication session (e.g., a phone call) is ongoing over the second communication line (e.g., the personal communication line associated with the personal MDN).

As shown, user interface 602 may be configured to allow the user to conduct a single communication session (e.g., a communication session with a contact named "Mary B."). Because only one communication may currently be conducted over the second communication line (e.g., the personal communication line), no session icons (e.g., such as session icons 704 and 708 discussed above in relation to FIG. 7) may be presented within content pane 606-2 of "PERSONAL" tab 606-1. However, as shown, content pane 606-2 may include a background 802 associated with the contact (e.g., Mary B.) with whom the communication session is being conducted, and one or more session controls 712 as described above.

Referring again to FIGS. 6-8 collectively, system 100 may allow a user of communication device 300 to initiate and/or conduct concurrent communication sessions over both a first communication line (e.g., a business communication line associated with "WORK" tab 604) and a second communication line (e.g., a personal communication line associated with "PERSONAL" tab 606). For example, while one or more communication sessions are ongoing with one or more additional communication devices over the first communication line, one or more additional communication sessions may be initiated and/or accepted with one or more additional communication devices over the second communication line. For example, the active phone call with John A. and the non-active phone call with Liz E. on the business communication line discussed in relation to FIG. 7 may be conducted concurrently with the phone call with Mary B. discussed in relation to FIG. 8.

When system 100 conducts a first communication session between communication device 300 and a first additional communication device over the first communication line while a second communication session between communication device 300 and a second additional communication device is ongoing over the second communication line, system 100 may be configured such that only one of the first and the second communication sessions is an active communication session at a particular time. For example, if the active phone call with John A. is being conducted over the first communication line while the phone call with Mary B. is being concurrently conducted over the second communication line, system 100 may automatically put the phone call with John A. into a non-active state (e.g., on-hold) when the phone call with Mary B. is active, and, conversely, system 100 may automatically put the phone call with Mary B. into a non-active state when the phone call with John A. is active.

Moreover, user interface 602 may be configured to allow the user to select between making the first communication session (e.g., the phone call with John A.) the active communication session and making the second communication session (e.g., the phone call with Mary B.) the active communication session by selecting a tab associated with the communication session that the user wants to be active. In other words, just as concurrent communication sessions on the same communication line (e.g., the phone calls with John A. and Liz E. described in reference to FIG. 7) may be activated and deactivated (e.g., put on hold) by selecting session icons (e.g., session icons 704 and 708), concurrent communication sessions on separate communication lines (e.g., the phone calls with John A. and Liz E. on the business communication line and the phone call with Mary B. on the personal communication line) can be activated and deactivated by selecting the tabs associated with the communication lines (e.g., by selecting tab labels 604-1 and/or 606-1 of "WORK" tab 604 and "PERSONAL" tab 606, respectively).

In certain embodiments, system 100 may detect a user selection of a selectable contact item from a contact directory presented by a communication device within an on-screen user interface. The selectable contact item may be representative of a contact of a user and may include contact information associated with the contact. System 100 may determine, based on the contact information associated with the selectable contact item, that the contact is associated with a first communication line and is not associated with a second communication line. As a result of this determination, system 100 may initiate a communication session with an additional communication device associated with the contact over the first communication line.

For example, system 100 may detect a user selection of a selectable contact item 608 presented within user interface 602 as described in relation to FIG. 6. More specifically, system 100 may detect that the user touches the selectable contact item 608 associated with the contact named "Peter F." System 100 may determine, based on information associated with Peter F. stored within contact data 108 of storage facility 104 in FIG. 1, that Peter F. is a work contact associated with a business communication line (e.g., associated with "WORK" tab 604) and not a personal contact associated with a personal communication line (e.g., associated with "PERSONAL" tab 606). As a result of the determination that Peter F. is a work contact and not a personal contact, system 100 may initiate a communication session (e.g., a phone call or a messaging exchange) with an additional communication device associated with Peter F. (e.g., one of communication devices 210 in FIG. 2) over the business communication line.

Figure 9:
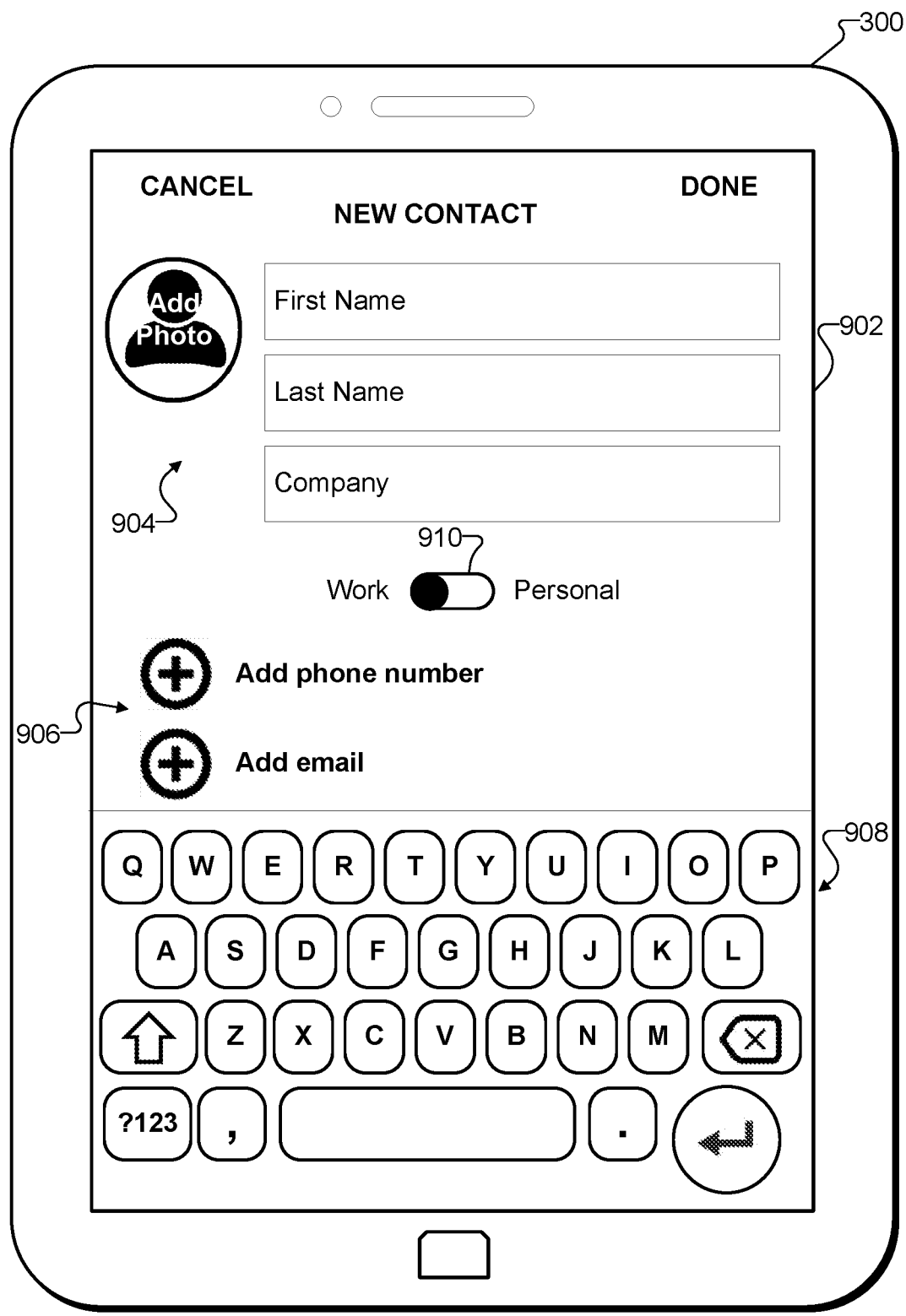
FIG. 9 shows an exemplary communication device on which an exemplary on-screen user interface allows a user to enter information associated with a contact according to principles described herein.

To illustrate, FIG. 9 shows exemplary communication device 300 on which an exemplary on-screen user interface 902 allows a user to enter information associated with a contact. User interface 902 may be configured to allow a user of communication device 300 to enter information associated with a contact to be stored by system 100. User interface 902 may present one or more fields allowing the user to enter any suitable information. For example, as shown, the user may enter personal information 904 about the contact such as a first and last name of the contact, a company for which the contact works, a photo of the contact or other icon representative of the contact, and/or any other suitable personal information that the user may wish to store in relation to the contact. Additionally, user interface 902 may allow the user to enter MDN information 906 such as one or more phone numbers (e.g., a mobile phone number, a home phone number, a work phone number, etc.), one or more email addresses (e.g., a work email address, a personal email address, etc.), and/or any other suitable MDNs that may be associated with the contact. As illustrated, personal information 904 and/or MDN information 906 may be entered using an alphabetic typing keypad 908 (e.g., a QWERTY keyboard) and/or another suitable user input panel such as a numeric dialing keypad (not shown).

User interface 902 may further be configured to allow the user to select a communication line to associate with the contact. For example, as shown, a graphical user input component 910 may be included within user interface 902 and may include one or more slider switches and/or other suitable input components (e.g. a checkbox, a selectable menu item, etc.) configured to allow the user to associate the contact with a communication line associated with "Work," a communication line associated with "Personal," and/or any other communication line associated with communication device 300.

System 100 may store and use information entered within user interface 902 in any suitable way. For example, as described above with respect to FIG. 1, contact data 108 within storage facility 104 may be used to store the information associated with the contact entered using user interface 902. As described above with respect to FIG. 6, a contact directory including one or more selectable contact items 608 may be presented based on the information stored within contact data 108. For example, each selectable contact item 608 may include a first name, a last initial, and a photo or other icon that were stored within contact data 108 using user interface 902. Moreover, system 100 may use the information entered using input component 910 to associate the contact with a particular communication line (e.g., with the "Work" communication line or the "Personal" communication line) to determine which communication line to use when initiating a communication session with a communication device associated with the contact.

Thus, in certain examples, a user may perform a user action to initiate a communication session directly from a selectable contact item (e.g., one of selectable items 608 in FIG. 6) rather than from a communication record (e.g., one of communication records 312 in FIG. 3 and/or FIG. 5 or communication records 402 in FIG. 4 and/or FIG. 5). System 100 may initiate the communication session over the communication line indicated by contact information stored within contact data 108 (e.g., contact information entered using input component 910) rather than over a communication line associated with the contact in one or more communication records within an aggregated communication history (e.g. aggregated communication history 304 in FIGS. 3-5).

In other examples, the user may perform a user action to initiate a communication session with a person that is not associated with a particular communication line either within contact data 108 or within a communication record within aggregated communication history 304. For example, a user may manually input an MDN to initiate a communication session with a person whom the user has not previously initiated a communication session with. In these or other examples, system 100 may detect that the user action is performed at a particular time and may determine that the particular time is associated with a first communication line and is not associated with a second communication line. System 100 may then initiate the communication session with the person that is not associated with a particular communication line over the first communication line based on the determination that the particular time is associated with the first communication line.

In certain examples, the determination that the particular time is associated with the first communication line and not the second communication line may be based on a time of day of the particular time (e.g., after 5:00 PM, before 8:00 AM, etc.), a day of the week of the particular time (e.g., a weekday Monday through Friday, a weekend day Saturday or Sunday, etc.), a date of the particular time (e.g., a national holiday, a birthday of the user, etc.), or any other suitable association that the particular time may have with the communication lines. Thus, for example, where the first communication line is a business communication line of the user and the second communication line is a personal communication line of the user, communication sessions initiated by the user during times when the user is not typically working may be carried over the personal communication line by default, while communication sessions initiated by the user during times when the user is typically working may be carried over the business communication line by default.

Figure 10:
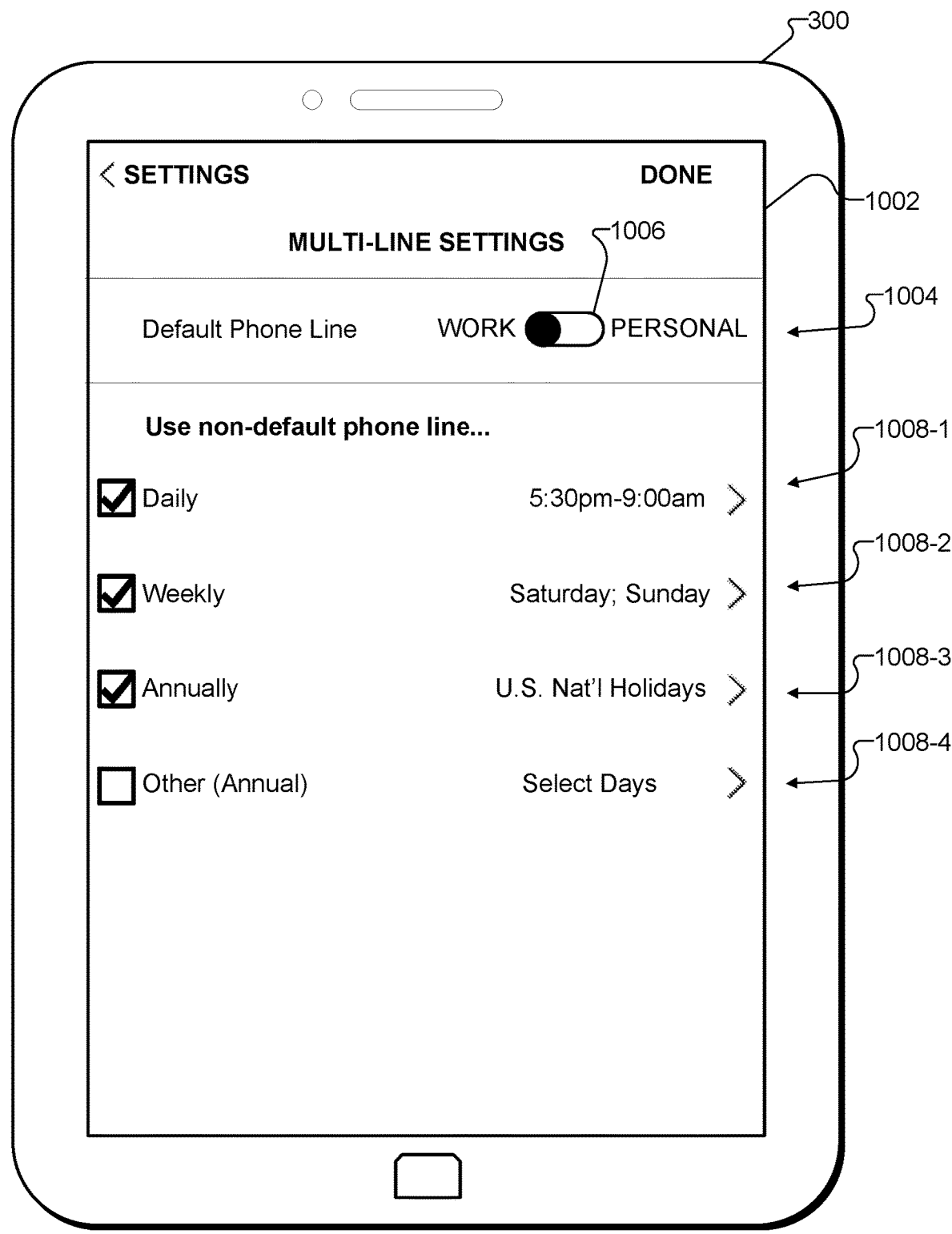
FIG. 10 shows an exemplary communication device on which an exemplary on-screen user interface allows a user to enter settings associated with multiple communication lines according to principles described herein.

To illustrate, FIG. 10 shows exemplary communication device 300 on which an exemplary on-screen user interface 1002 that allows a user to enter settings associated with multiple communication lines may be presented by system 100. User interface 1002 may be configured to allow a user of communication device 300 to enter default rules that system 100 may use to determine over which communication line to initiate certain communication sessions. For example, a user may set default rules using user interface 1002 that system 100 may follow when a communication session is not initiated based on a communication record (e.g., from an aggregated communication history) or based on contact information associated with a contact.

User interface 1002 may allow default rules to be entered in any suitable way. For example, as shown in FIG. 10, user interface 1002 may include a default communication line setting 1004 including a graphical user input component 1006 and one or more non-default rule settings 1008 (e.g., daily rule setting 1008-1, weekly rule setting 1008-2, annually rule setting 1008-3, other rule setting 1008-4, and/or any other suitable non-default rule settings that may serve a particular implementation). Each of the settings illustrated within user interface 1002 will now be described.

Default communication line setting 1004 may include an input component 1006 that allows a user of communication device 300 to select a default communication line to use for initiating communication sessions. For example, a default communication line may be used to initiate a communication session when no particular communication line is associated with the communication session being initiated, such as when the communication session is initiated with an additional communication device that is not associated with contact information stored within system 100, when the communication session is not initiated based on a communication record of a previous communication session stored within an aggregated communication history, and/or when the particular time in which the communication session is initiated does not implicate a non-default rule setting as discussed below. For example, the user may primarily use a business communication line associated with communication device 300 for work communication sessions, but the user may also have a personal communication line associated with communication device 300 for personal communication sessions. Accordingly, the user may associate default communication line setting 1004 with the business communication line by setting input component 1006 to "WORK," as shown.

In an example where communication device 300 is associated with two communication lines, input component 1006 may include a slider switch that allows the user to select a default communication line from between the two communication lines (e.g., a communication line associated with "WORK" and a communication line associated with "PERSONAL"). In other examples, any other suitable input component that allows the user to select a default communication line may be used. For example, input component 1006 may include selectable menu items, checkboxes, etc.

Non-default rule settings 1008 may allow the user to configure one or more rules (e.g., time-based rules) for initiating communication sessions from a communication device (e.g., communication device 300) associated with multiple communication lines. In some examples, rule settings 1008 may specify certain times (e.g., times of day, days of the week, calendar dates, etc.) in which a non-default communication line (e.g., a communication line not selected by default communication line setting 1004) is to be used to initiate communication sessions from communication device 300. For example, the user may wish to use the personal communication line after work hours (e.g., between the hours of 5:30 PM and 9:00 AM each night), on weekends (e.g., all day Saturday and Sunday), and all day on certain annual occasions (e.g., U.S. National Holidays). Thus, as shown, the user may configure particular rule settings 1008 using user interface 1002 (e.g., daily times, weekly days, annual days, etc., when communication sessions are to be carried over the non-default communication line) and may enable the particular rule settings 1008 (e.g., by selecting a checkbox or other input component). Each rule setting 1008 may be configured and enabled using any suitable input components (e.g., selectable checkboxes, pull-down menus, rolling selection fields, text fields, switches, etc.).

Figure 11:
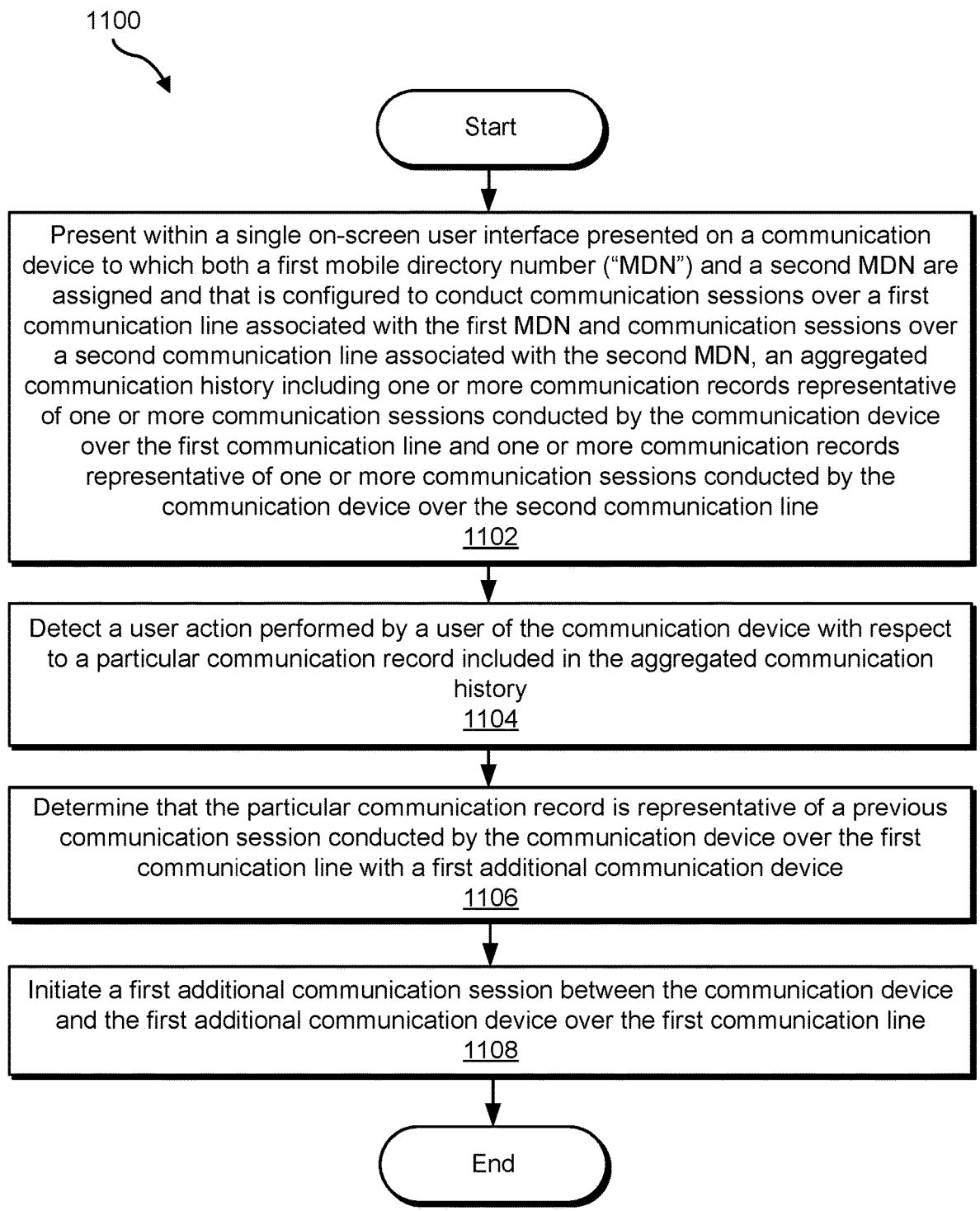
FIGS. 11-12 illustrate exemplary methods for managing multiple communication lines within a single on-screen user interface according to principles described herein.

FIG. 11 illustrates an exemplary method 1100 of managing multiple communication lines within a single on-screen user interface. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or any implementation thereof.

In operation 1102, a multi-line communication system presents within a single on-screen user interface presented on a communication device to which both a first MDN and a second MDN are assigned and that is configured to conduct communication sessions over a first communication line associated with the first MDN and communication sessions over a second communication line associated with the second MDN, an aggregated communication history including one or more communication records representative of one or more communication sessions conducted by the communication device over the first communication line and one or more communication records representative of one or more communication sessions conducted by the communication device over the second communication line. Operation 1102 may be performed in any of the ways described herein.

In operation 1104, the multi-line communication system detects a user action performed by a user of the communication device with respect to a particular communication record included in the aggregated communication history. Operation 1104 may be performed in any of the ways described herein.

In operation 1106, the multi-line communication system determines that the particular communication record is representative of a previous communication session conducted by the communication device over the first communication line with a first additional communication device. For example, the multi-line communication system may determine that the particular communication record is representative of the previous communication session in response to the user action detected in operation 1104. Operation 1106 may be performed in any of the ways described herein.

In operation 1108, the multi-line communication system initiates a first additional communication session between the communication device and the first additional communication device over the first communication line. For example, the multi-line communication system may initiate the first additional communication session between the communication device and the first additional communication device over the first communication line based on the determination in operation 1106 that the particular communication record is representative of the previous communication session conducted by the communication device over the first communication line. Operation 1108 may be performed in any of the ways described herein.

Figure 12:
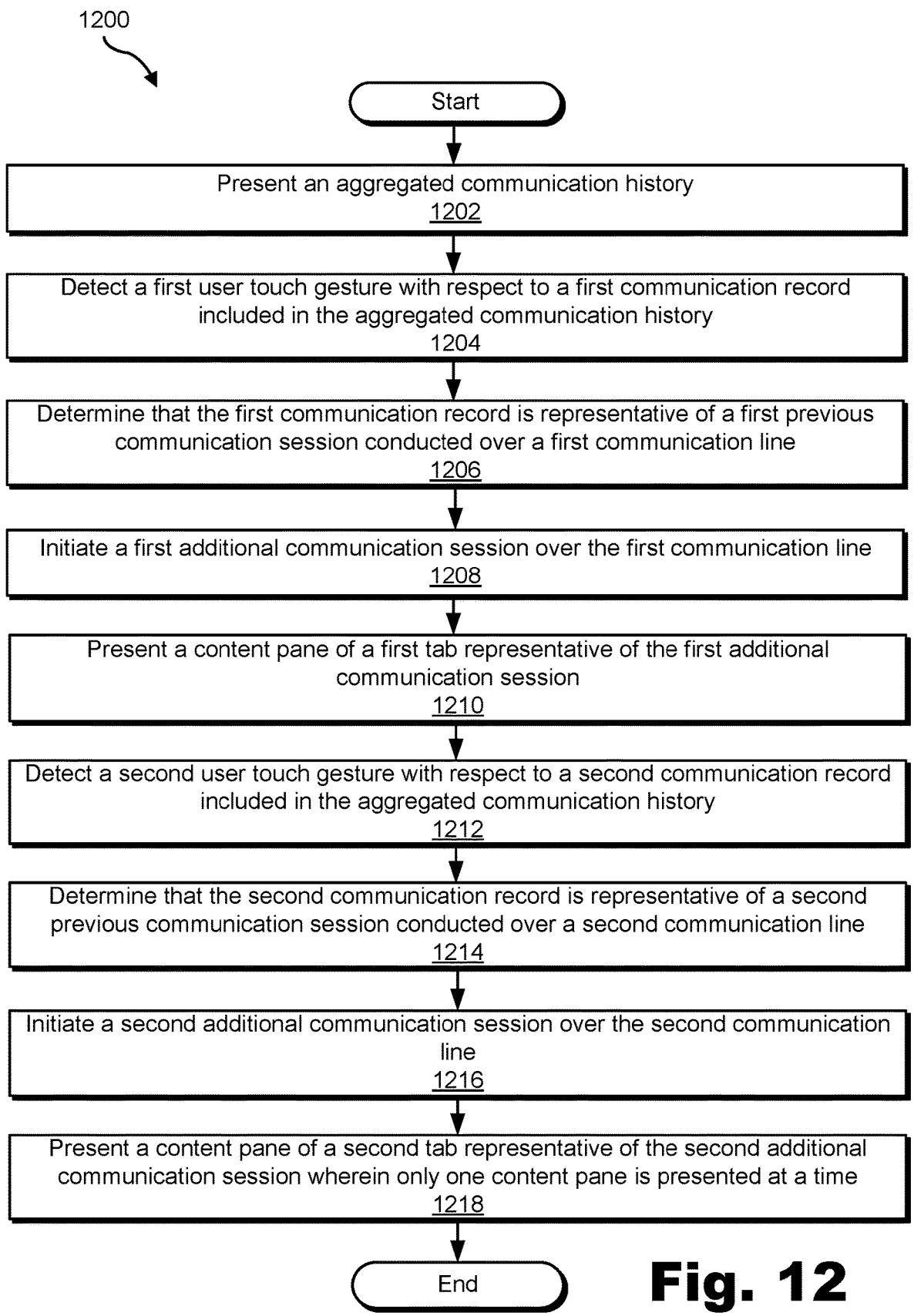

FIG. 12 illustrates another exemplary method 1200 of managing multiple communication lines within a single on-screen user interface. While FIG. 12 illustrates exemplary operations according to one embodiment, other embodiments may omit, add to, reorder, and/or modify any of the operations shown in FIG. 12. One or more of the operations in FIG. 12 may be performed by system 100 and/or any implementation thereof.

In operation 1202, a multi-line communication system presents an aggregated communication history. For example, the multi-line communication system may present within a single touchscreen user interface presented on a communication device to which both a first MDN and a second MDN are assigned and that is configured to conduct communication sessions over a first communication line associated with the first MDN and communication sessions over a second communication line associated with the second MDN, an aggregated communication history including one or more communication records representative of one or more communication sessions conducted by the communication device over the first communication line and one or more communication records representative of one or more communication sessions conducted by the communication device over the second communication line. Operation 1202 may be performed in any of the ways described herein.

In operation 1204, the multi-line communication system detects a first user touch gesture performed by a user with respect to a first communication record included in the aggregated communication history. Operation 1204 may be performed in any of the ways described herein.

In operation 1206, the multi-line communication system determines that the first communication record is representative of a first previous communication session conducted by the communication device over the first communication line with a first additional communication device. For example, the multi-line communication system may determine that the first communication record is representative of the first previous communication session in response to the first user touch gesture detected in Operation 1204. Operation 1206 may be performed in any of the ways described herein.

In operation 1208, the multi-line communication system initiates a first additional communication session with the first additional communication device over the first communication line. For examples, the multi-line communication system may initiate the first additional communication session with the first additional communication device over the first communication line based on the determination in operation 1206 that the first communication record is representative of the first previous communication session conducted by the communication device over the first communication line. Operation 1208 may be performed in any of the ways described herein.

In operation 1210, the multi-line communication system presents a content pane of a first tab representative of the first additional communication session. For example, the multi-line communication system may present the content pane of the first tab within the touchscreen user interface based on the initiation of the first additional communication session. Operation 1210 may be performed in any of the ways described herein.

In operation 1212, the multi-line communication system detects a second user touch gesture (e.g., performed by a user) with respect to a second communication record included in the aggregated communication history. Operation 1212 may be performed in any of the ways described herein.

In operation 1214, the multi-line communication system determines that the second communication record is representative of a second previous communication session conducted by the communication device over the second communication line with a second additional communication device. For example, the multi-line communication system may determine that the second communication record is representative of the second previous communication session in response to the second user touch gesture detected in operation 1212. Operation 1214 may be performed in any of the ways described herein.

In operation 1216, the multi-line communication system initiates a second additional communication session over the second communication line. For example, the multi-line communication system may initiate the second additional communication session with the second additional communication device over the second communication line based on the determination in operation 1214 that the second communication record is representative of the second previous communication session conducted by the communication device over the second communication line. Operation 1216 may be performed in any of the ways described herein.

In operation 1218, the multi-line communication system presents a content pane of a second tab representative of the second additional communication session, wherein only one content pane of the content pane of the first tab and the content pane of the second tab is presented at a particular time within the touchscreen user interface. For example, the multi-line communication system may present the content pane of the second tab within the touchscreen user interface based on the initiation of the second additional communication session in operation 1216. Operation 1218 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
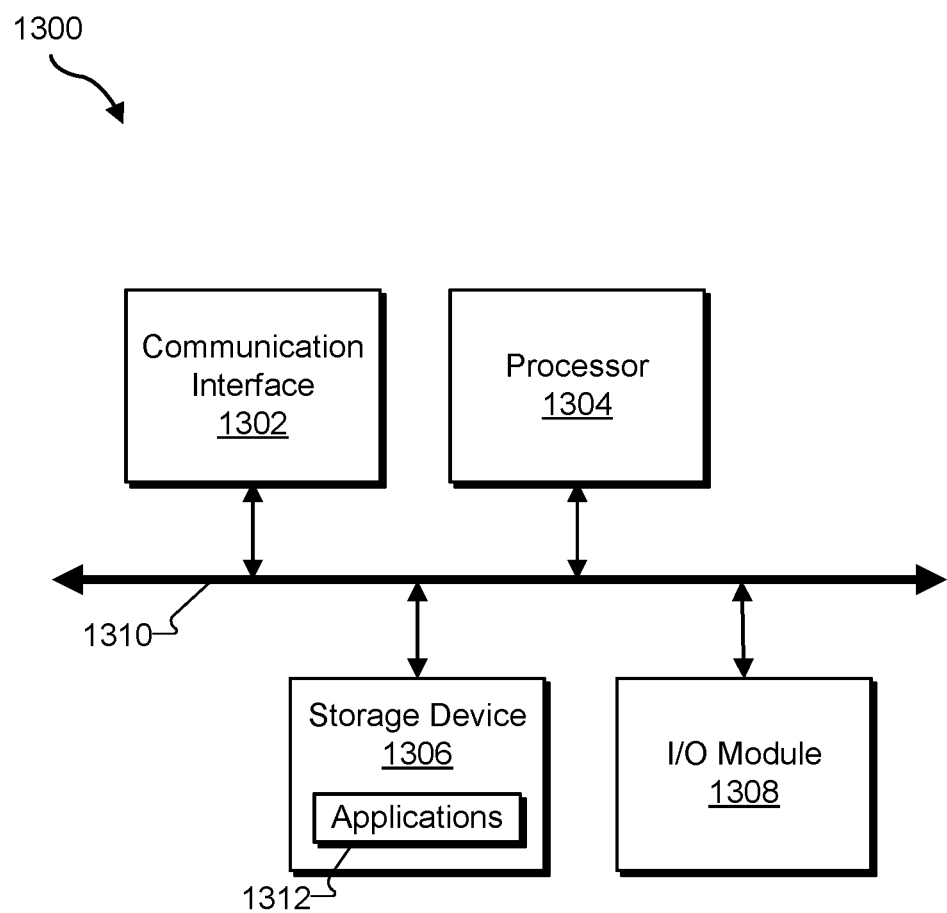
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with management facility 102. Likewise, storage facility 104 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

presenting, by a multi-line communication system within a single on-screen user interface presented on a communication device to which both a first mobile directory number ("MDN") and a second MDN are assigned and that is configured to conduct communication sessions over a first communication line associated with the first MDN and communication sessions over a second communication line associated with the second MDN, an aggregated communication history including one or more communication records representative of one or more communication sessions conducted by the communication device over the first communication line and one or more additional communication records representative of one or more additional communication sessions conducted by the communication device over the second communication line, the aggregated communication history including communication history information related to one or more phone calls conducted by the communication device and to one or more messaging exchanges conducted by the communication device, the one or more communication records and the one or more additional communication records provided for concurrent display within the single on-screen user interface;

detecting, by the multi-line communication system, a user action performed by a user of the communication device with respect to a particular communication record that is included in the aggregated communication history and that represents a previous communication session, the particular communication record including an initiation indicator provided for display in the aggregated communication history, the initiation indicator indicating which of the first communication line and the second communication line was used during the previous communication session;

determining, by the multi-line communication system in response to the user action and based on information indicated in the initiation indicator, that the previous communication session represented by the particular communication record was conducted by the communication device over the first communication line with a first additional communication device; and initiating, by the multi-line communication system based on the determination that the particular communication record is representative of the previous communication session conducted by the communication device over the first communication line, a first additional communication session between the communication device and the first additional communication device over the first communication line, wherein the first MDN is a first phone number assigned to the communication device and the second MDN is a second phone number assigned to the communication device, the first phone number and the second phone number usable by other communication devices to initiate the communication sessions with the communication device, the user action consists of one of a first single swipe touch gesture and a second single swipe touch gesture on the particular communication record included in the aggregated communication history within the single on-screen user interface, the first single swipe touch gesture different than the second single swipe touch gesture, the first single swipe touch gesture is provided in a first lateral direction with respect to the particular communication record, the second single swipe touch gesture is provided in a second lateral direction with respect to the particular communication record, and regardless of whether the particular communication record is a phone call communication record or a messaging exchange communication record in the aggregated communication history, the first additional communication session is initiated as a messaging exchange when the user performs the first single swipe touch gesture on the particular communication record within the single on-screen user interface, and the first additional communication session is initiated as a phone call when the user performs the second single swipe touch gesture on the particular communication record within the single on-screen user interface.

2. The method of claim 1, wherein:
the one or more phone calls include at least one of a voice call, a video call, and a group call; and
the one or more messaging exchanges include at least one of a text messaging exchange, a multimedia messaging exchange, and a group messaging exchange.

3. The method of claim 1, further comprising conducting, by the multi-line communication system while the first additional communication session is ongoing over the first communication line, a second additional communication session between the communication device and a second additional communication device over the second communication line.

4. The method of claim 3, wherein:
only one of the first and the second additional communication sessions is an active communication session at a particular time; and
the single on-screen user interface is configured to allow the user to select between making the first additional communication session the active communication session and making the second additional communication session the active communication session.

5. The method of claim 4, wherein:
the first additional communication session is represented within a content pane of a first tab within the single on-screen user interface;
the second additional communication session is represented within a content pane of a second tab within the single on-screen user interface; and
only one content pane of the content pane of the first tab and the content pane of the second tab is presented at the particular time within the single on-screen user interface, the only one content pane presented corresponding to the active communication session selected by the user.

6. The method of claim 1, further comprising:
detecting, by the multi-line communication system, a user selection of a selectable contact item from a contact directory presented by the communication device within the single on-screen user interface, the selectable contact item representative of a contact of the user and including contact information associated with the contact;
determining, by the multi-line communication system based on the contact information associated with the selectable contact item, that the contact is associated with the second communication line and not the first communication line; and initiating, by the multi-line communication system based on the determination that the contact is associated with the second communication line and not the first communication line, a second additional communication session with a second additional communication device associated with the contact over the second communication line.

7. The method of claim 1, further comprising:
detecting, by the multi-line communication system, that an additional user action to initiate a second additional communication session is performed by the user at a particular time;
determining, by the multi-line communication system, that the particular time is associated with the second communication line and not the first communication line; and
initiating, by the multi-line communication system based on the determination that the particular time is associated with the second communication line and not the first communication line, the second additional communication session with a second additional communication device over the second communication line.

8. The method of claim 7, wherein the determination that the particular time is associated with the second communication line and not the first communication line is based on at least one of a time of day of the particular time, a day of the week of the particular time, and a date of the particular time.

9. The method of claim 1, embodied as computer-executable instructions on at least one non-transitory computer-readable medium.

10. A method comprising:
presenting, by a multi-line communication system within a single touchscreen user interface presented on a communication device to which both a first mobile directory number ("MDN") and a second MDN are assigned and that is configured to conduct communication sessions over a first communication line associated with the first MDN and communication sessions over a second communication line associated with the second MDN, an aggregated communication history including one or more communication records representative of one or more communication sessions conducted by the communication device over the first communication line and one or more additional communication records representative of one or more additional communication sessions conducted by the communication device over the second communication line, the aggregated communication history including communication history information related to one or more phone calls conducted by the communication device and to one or more messaging exchanges conducted by the communication device, the one or more communication records and the one or more additional communication records provided for concurrent display within the single on-screen user interface;
detecting, by the multi-line communication system, a first user touch gesture performed by a user of the communication device with respect to a first communication record that is included in the aggregated communication history and that represents a first previous communication session, the first communication record including an initiation indicator provided for display in the aggregated communication history, the initiation indicator indicating which of the first communication line and the second communication line was used during the previous communication session;

determining, by the multi-line communication system in response to the first user touch gesture and based on information indicated by the initiation indicator, that the first previous communication session represented by the first communication record was conducted by the communication device over the first communication line with a first additional communication device;

initiating, by the multi-line communication system based on the determination that the first communication record is representative of the first previous communication session conducted by the communication device over the first communication line, a first additional communication session with the first additional communication device over the first communication line;

presenting, by the multi-line communication system within the touchscreen user interface and based on the initiation of the first additional communication session, a content pane of a first tab representative of the first additional communication session;

detecting, by the multi-line communication system, a second user touch gesture performed by the user with respect to a second communication record included in the aggregated communication history;

determining, by the multi-line communication system in response to the second user touch gesture, that the second communication record is representative of a second previous communication session conducted by the communication device over the second communication line with a second additional communication device;

initiating, by the multi-line communication system based on the determination that the second communication record is representative of the second previous communication session conducted by the communication device over the second communication line, a second additional communication session with the second additional communication device over the second communication line; and presenting, by the multi-line communication system within the touchscreen user interface and based on the initiation of the second additional communication session, a content pane of a second tab representative of the second additional communication session;

wherein
only one content pane of the content pane of the first tab and the content pane of the second tab is presented at any particular time within the touchscreen user interface, the first MDN is a first phone number assigned to the communication device and the second MDN is a second phone number assigned to the communication device, the first phone number and the second phone number usable by other communication devices to initiate the communication sessions with the communication device, and regardless of whether the first communication record is a phone call communication record or a messaging exchange communication record in the aggregated communication history, the first additional communication session is initiated as a messaging exchange when the first touch gesture corresponds to a first type of single swipe touch input on the particular communication record within the single on-screen user interface, and the first additional communication session is initiated as a phone call when the second touch gesture corresponds to a second type of single swipe touch input different from the first single swipe type of touch input on the particular communication record within the single on-screen user interface, the first type of single swipe touch input is provided in a first lateral direction with respect to the particular communication record, and the second type of single swipe touch input is provided in a second lateral direction with respect to the particular communication record.

11. The method of claim 10, embodied as computer-executable instructions on at least one non-transitory computer-readable medium.

12. A system comprising:
at least one physical computing device that:
presents, within a single on-screen user interface presented on a communication device to which both a first mobile directory number ("MDN") and a second MDN are assigned and that is configured to conduct communication sessions over a first communication line associated with the first MDN and communication sessions over a second communication line associated with the second MDN, an aggregated communication history including one or more communication records representative of one or more communication sessions conducted by the communication device over the first communication line and one or more additional communication records representative of one or more additional communication sessions conducted by the communication device over the second communication line, the aggregated communication history including communication history information related to one or more phone calls conducted by the communication device and to one or more messaging exchanges conducted by the communication device, the one or more communication records and the one or more additional communication records provided for concurrent display within the single on-screen user interface;

detects a user action performed by a user of the communication device with respect to a particular communication record that is included in the aggregated communication history and that represents a previous communication session, the particular communication record including an initiation indicator provided for display in the aggregated communication history, the initiation indicator indicating which of the first communication line and the second communication line was used during the previous communication session;

determines, in response to the user action and based on information indicated by the initiation indicator, that the previous communication session represented by the particular communication record was conducted by the communication device over the first communication line with a first additional communication device; and initiates, based on the determination that the particular communication record is representative of the previous communication session conducted by the communication device over the first communication line, a first additional communication session between the communication device and the first additional communication device over the first communication line, wherein
  the first MDN is a first phone number assigned to the communication device and the second MDN is a second phone number assigned to the communication device, the first phone number and the second phone number usable by other communication devices to initiate the communication sessions with the communication device,
  the user action consists of one of a first single swipe touch gesture and a second single swipe touch gesture on the particular communication record included in the aggregated communication history within the single on-screen user interface, the first single swipe touch gesture different than the second single swipe touch gesture,
  the first single swipe touch gesture is provided in a first lateral direction with respect to the particular communication record,
  the second single swipe touch gesture is provided in a second lateral direction with respect to the particular communication record, and
  regardless of whether the particular communication record is a phone call communication record or a messaging exchange communication record in the aggregated communication history,
    the first additional communication session is initiated as a messaging exchange when the user performs the first single swipe touch gesture on the particular communication record within the single on-screen user interface, and
    the first additional communication session is initiated as a phone call when the user performs the second single swipe touch gesture on the particular communication record within the single on-screen user interface.

13. The system of claim 12, wherein the at least one physical computing device further conducts, while the first additional communication session is ongoing over the first communication line, a second additional communication session between the communication device and a second additional communication device over the second communication line.

14. The system of claim 13, wherein:
  only one of the first and the second additional communication sessions is an active communication session at a particular time; and
  the single on-screen user interface is configured to allow the user to select between making the first additional communication session the active communication session and making the second additional communication session the active communication session.

15. The system of claim 14, wherein:
  the first additional communication session is represented within a content pane of a first tab within the single on-screen user interface;
  the second additional communication session is represented within a content pane of a second tab within the single on-screen user interface; and
  only one content pane of the content pane of the first tab and the content pane of the second tab is presented at the particular time within the single on-screen user interface, the only one content pane presented corresponding to the active communication session selected by the user.

16. The system of claim 12, wherein the at least one physical computing device further:
  detects a user selection of a selectable contact item from a contact directory presented by the communication device within the single on-screen user interface, the selectable contact item representative of a contact of the user and including contact information associated with the contact;
  determines, based on the contact information associated with the selectable contact item, that the contact is associated with the second communication line and not the first communication line; and
  initiates, based on the determination that the contact is associated with the second communication line and not the first communication line, a second additional communication session with a second additional communication device associated with the contact over the second communication line.

17. The system of claim 12, wherein the at least one physical computing device further:
  detects that an additional user action to initiate a second additional communication session is performed by the user at a particular time;
  determines that the particular time is associated with the second communication line and not the first communication line; and
  initiates, based on the determination that the particular time is associated with the second communication line and not the first communication line, the second additional communication session with a second additional communication device over the second communication line.

* * * * *